US010185151B2

(12) United States Patent  (10) Patent No.: US 10,185,151 B2
Lee et al.  (45) Date of Patent: Jan. 22, 2019

(54) WAVEGUIDE DISPLAY WITH A SMALL FORM FACTOR, A LARGE FIELD OF VIEW, AND A LARGE EYEBOX

(71) Applicant: Facebook Technologies, LLC, Menlo Park, CA (US)

(72) Inventors: Hee Yoon Lee, Redmond, WA (US); Wanli Chi, Sammamish, WA (US); Pasi Saarikko, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/704,190

(22) Filed: Sep. 14, 2017

(65) Prior Publication Data
US 2018/0172995 A1   Jun. 21, 2018

Related U.S. Application Data

(60) Provisional application No. 62/436,717, filed on Dec. 20, 2016.

(51) Int. Cl.
*G02B 6/00* (2006.01)
*G02B 27/01* (2006.01)
*F21V 8/00* (2006.01)

(52) U.S. Cl.
CPC ....... *G02B 27/0172* (2013.01); *G02B 6/0016* (2013.01); *G02B 2027/015* (2013.01); *G02B 2027/0125* (2013.01)

(58) Field of Classification Search
None
See application file for complete search history.

(56) References Cited

U.S. PATENT DOCUMENTS 9,400,387 B2 *   7/2016   Simmonds ......... G02B 27/1086
2002/0008854 A1   1/2002   Travis
2006/0132914 A1   6/2006   Weiss et al.
(Continued)

FOREIGN PATENT DOCUMENTS

WO   WO 2013/163347 A1   10/2013
WO   WO 2015/078788 A1   6/2015
WO   WO 2016/020643 A1   2/2016

OTHER PUBLICATIONS

PCT International Search Report and Written Opinion, PCT Application No. PCT/US2017/061799, dated Feb. 13, 2018, 17 pages.
(Continued)

*Primary Examiner* — Tina M Wong
(74) *Attorney, Agent, or Firm* — Fenwick & West LLP

(57) ABSTRACT

A waveguide display is used for presenting media to a user. The waveguide display includes light source assembly, an output waveguide, and a controller. The light source assembly includes one or more projectors projecting an image light at least along one dimension. The output waveguide includes a waveguide body with two opposite surfaces. The output waveguide includes a first grating receiving an image light propagating along an input wave vector, a second grating, and a third grating positioned opposite to the second grating and outputting an expanded image light with wave vectors matching the input wave vector. The controller controls the scanning of the one or more source assemblies to form a two-dimensional image.

14 Claims, 31 Drawing Sheets

(56) References Cited

U.S. PATENT DOCUMENTS

| | | |
|---|---|---|
| 2010/0149073 A1 | 6/2010 | Chaum et al. |
| 2010/0246003 A1 | 9/2010 | Simmonds et al. |
| 2012/0062998 A1 | 3/2012 | Schultz et al. |
| 2013/0314789 A1 | 11/2013 | Saarikko et al. |
| 2014/0218801 A1 | 8/2014 | Simmonds et al. |
| 2016/0252724 A1 | 9/2016 | Nikkhoo |

OTHER PUBLICATIONS

European Extended Search Report, European Application No. 17208645.6, dated May 3, 2018, 8 pages.

* cited by examiner

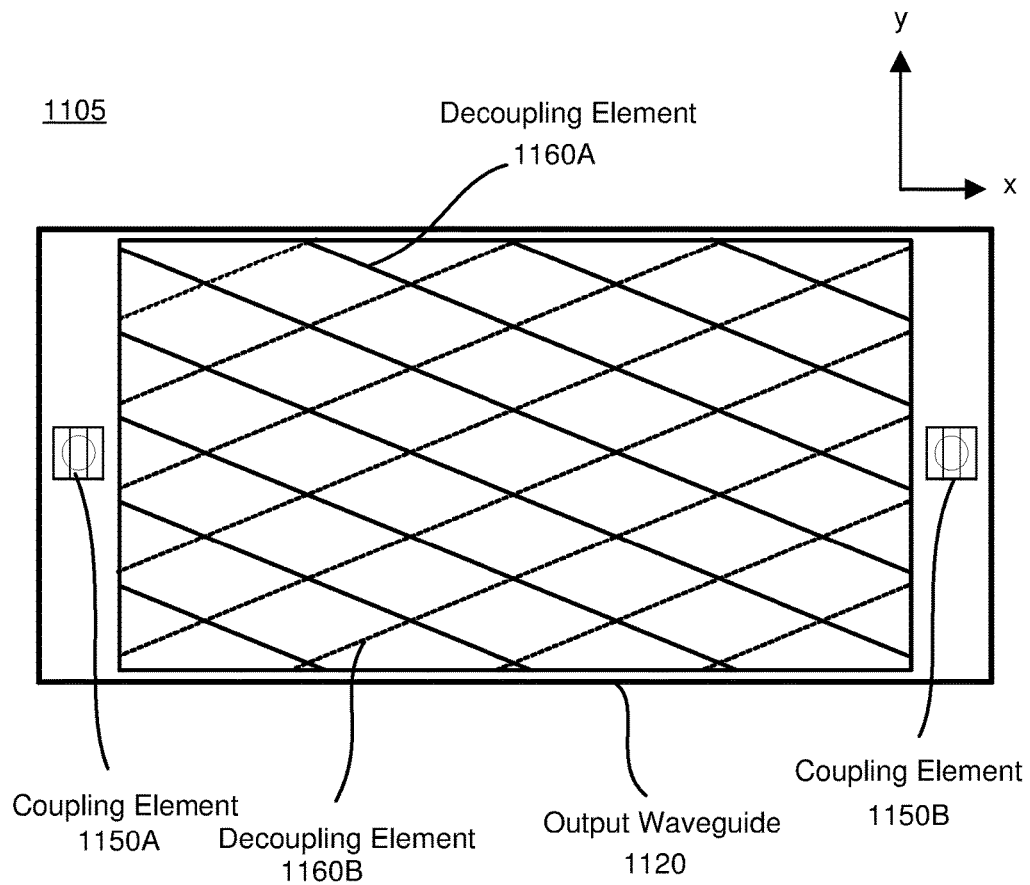
FIG. 11B
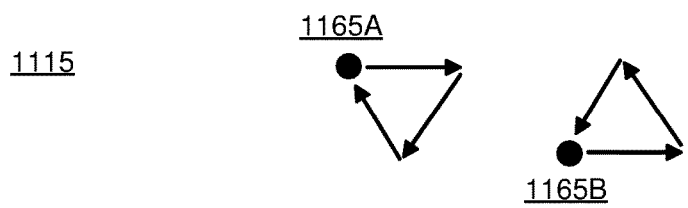
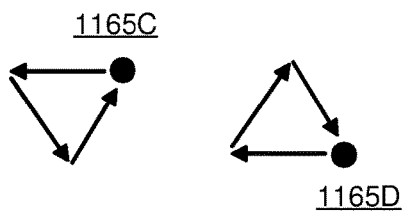
FIG. 11C

WAVEGUIDE DISPLAY WITH A SMALL FORM FACTOR, A LARGE FIELD OF VIEW, AND A LARGE EYEBOX

CROSS REFERENCE TO RELATED APPLICATIONS

This application claims the benefit of U.S. Provisional Application No. 62/436,717, filed Dec. 20, 2016, which is incorporated by reference in its entirety.

BACKGROUND

The disclosure relates generally to near-eye-display systems, and more specifically to waveguide displays with a small form factor, a large field of view, and a large eyebox.

Near-eye light field displays project images directly into a user's eye, encompassing both near-eye displays (NEDs) and electronic viewfinders. Conventional near-eye displays (NEDs) generally have a display element that generates image light that passes through one or more lenses before reaching the user's eyes. Additionally, NEDs in virtual reality systems and/or augmented reality systems have a design criteria to be compact and light weight, and to provide a two-dimensional expansion with a large eyebox and a wide field-of-view (FOV) for ease of use. In typical NEDs, the limit for the FOV is based on satisfying two physical conditions: (1) an occurrence of total internal reflection of image light coupled into a waveguide and (2) an existence of a first order diffraction caused by a diffraction grating element. Conventional methods used by the NEDs based on a diffraction grating rely on satisfying the above two physical conditions in order to achieve a large FOV (e.g. above 40 degrees) by using materials with a high refractive index, and thus, adds significantly heavy and expensive components to the NEDs. Furthermore, designing a conventional NED with two-dimensional expansion involving two different output grating elements that are spatially separated often result in a large form factor. Accordingly, it is very challenging to design NEDs using conventional methods to achieve a small form factor, a large FOV, and a large eyebox.

SUMMARY

A waveguide display is used for presenting media to a user. The waveguide display includes a light source assembly, an output waveguide, and a controller. The light source assembly includes one or more projectors projecting an image light at least along one dimension. In some configurations, each projector extends a first angular range on a first plane along a first dimension and a second dimension, and a second angular range on a second plane along the second dimension and the third dimension. The output waveguide receives the image light emitted from at least one of the projectors and outputs an expanded image light to an eyebox (e.g., a location in space occupied by an eye of a user of the waveguide display) with a rectangular area of at least 20 mm by 10 mm. The output waveguide provides a diagonal FOV of at least 60 degrees. The controller controls the scanning of the light source assembly to form a two-dimensional image. In some embodiments, the waveguide display includes a source waveguide that receives the image light from the light source assembly along a first dimension and expand the emitted image light along a second dimension orthogonal to the first dimension.

Light from the source assembly is in-coupled into the output waveguide through an in-coupling area located at one end of the output waveguide. The output waveguide includes a waveguide body with two opposite surfaces. The output waveguide includes at least an input diffraction grating on at least one of the opposite surfaces. The input diffraction grating in-couples the image light (propagating along an input wave vector) emitted from the light source assembly into the output waveguide, and the input diffraction grating has an associated first grating vector. In some configurations, there is a single projector, and the single projector is at a center of the first grating. In alternate configurations, the light source assembly includes a first projector and a second projector located along the same dimension with a threshold distance of separation.

The output waveguide expands the image light in two dimensions. The output waveguide includes a second and third grating (that are associated with a second and third grating vector, respectively) that together direct and decouple the expanded image light from the output waveguide. The output waveguide includes at least a first grating that receives the image light emitted from at least one of the one or more projectors and couples the received image light into the waveguide body, and the waveguide body expands the received image light in at least one dimension to transmit a first expanded image light. Each of the second grating and the third grating expands the first expanded image light along a different dimension to form a second expanded image light, and output the second expanded image light to an eyebox. In some configurations, the output expanded image light has a wave vector that matches the input wave vector and encompasses the first angular range and the second angular range throughout the eyebox along the first dimension and the second dimension. The input diffraction grating, the second grating, and the third grating are designed such that the vector sum of all their associated grating vectors is less than a threshold value, and the threshold value is close to or equal to zero.

BRIEF DESCRIPTION OF THE DRAWINGS

FIG. 11B illustrates a top view of the ninth design of the waveguide display shown in FIG. 7, in accordance with an embodiment.

FIG. 11C illustrates an example path of grating vectors associated with a plurality of diffraction gratings of the ninth design of the waveguide display shown in FIG. 7, in accordance with an embodiment.

Figure 1:
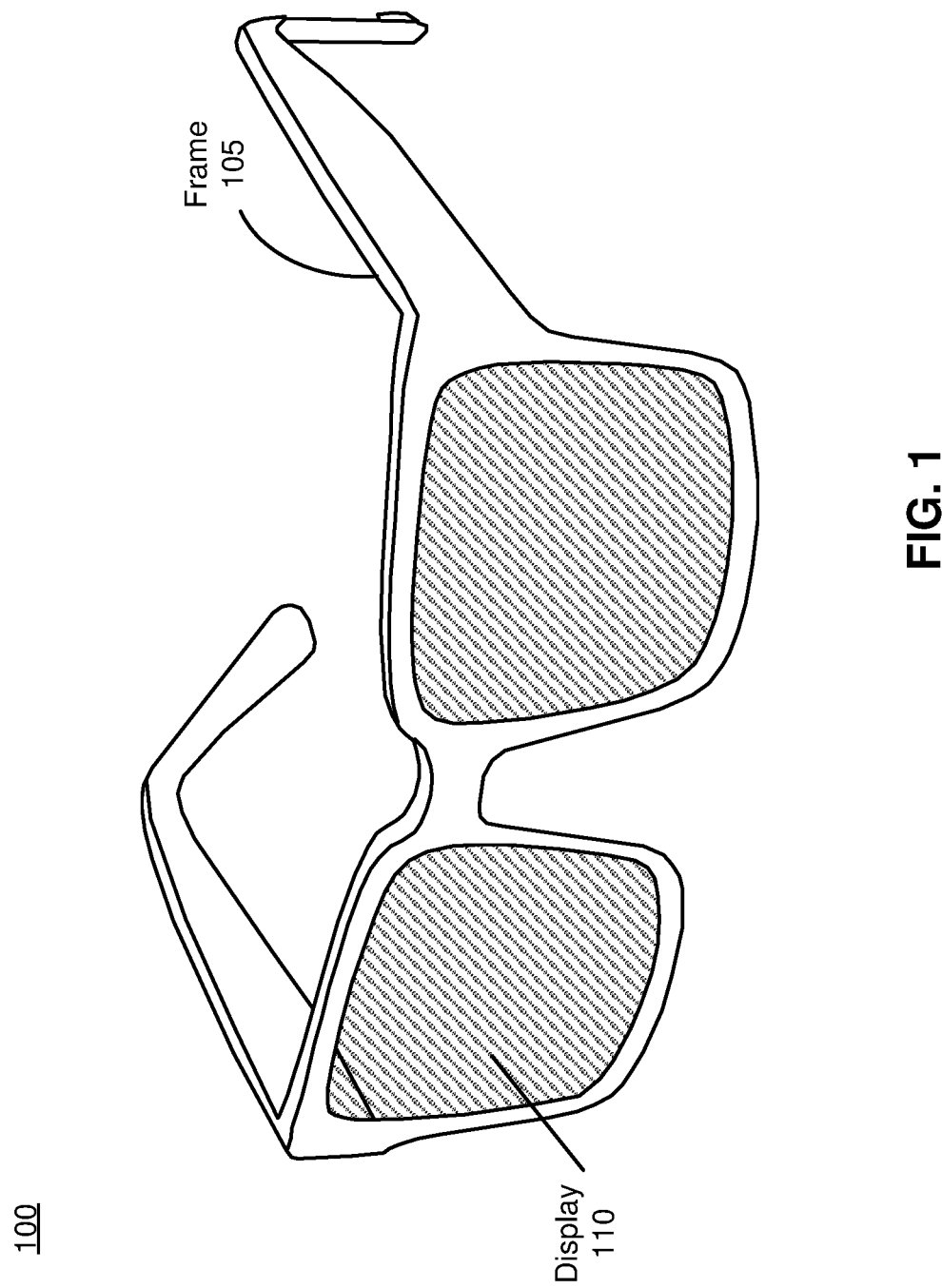
FIG. 1 is a diagram of a NED, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers A waveguide display is used for presenting media to a user. In some embodiments, the waveguide display is incorporated into, e.g., a near-eye-display (NED) as part of an artificial reality system. The waveguide display includes a light source assembly, an output waveguide, and a controller. The light source assembly includes one or more projectors projecting an image light at least along one dimension. In some configurations, each of the projectors extend a first angular range along a first dimension in the range of −26 degrees to +10 degrees and along a second dimension in the range of −15 degrees to +15 degrees, and a second angular range along the first dimension in the range of −10 degree to +26 degree and along the second dimension in the range of −15 degrees to +15 degrees. In one example, the total field-of-view (FOV) is 52 degrees along the first dimension and 30 degrees along the second dimension, and a diagonal FOV is 60 degrees. The output waveguide receives the image light emitted from at least one of the projectors and outputs an expanded image light to an eyebox (e.g., a location in space occupied by an eye of a user of the waveguide display) of at least 20 mm by 10 mm. The output waveguide also provides a diagonal FOV of at least 60 degrees. The controller controls the scanning of the light source assembly to form a two-dimensional image. In some embodiments, the waveguide display includes a source waveguide that receives the image light from the light source assembly along a first dimension and expand the emitted image light along the first dimension.

Light from the source assembly is in-coupled into the output waveguide through an in-coupling area located at one end of the output waveguide. The output waveguide outputs the image light at a location offset from the entrance location, and the location/direction of the emitted image light is based in part on the orientation of the source assembly. The output waveguide includes a waveguide body with two opposite surfaces. The output waveguide includes at least an input diffraction grating on at least one of the opposite surfaces. In some configurations, the input diffraction gratings have substantially the same area along a first and a second dimension, and are separated by a distance along a third dimension (e.g. on first and second surface, or both on first surface but separated with an interfacial layer, or on second surface and separated with an interfacial layer or both embedded into the waveguide body but separated with the interfacial layer). The input diffraction grating in-couples the image light (propagating along an input wave vector) emitted from the light source assembly into the output waveguide, and the input diffraction grating has an associated first grating vector. In some configurations, the one or more projectors is a single projector and is located at a center of the input diffraction grating. In alternate configurations, the light source assembly includes a first projector that projects light into a first input diffraction grating and a second projector that projects light into a second input diffraction grating.

A wave vector of a plane wave is a vector which points in the direction in which the wave propagates (perpendicular to the wave front associated with an image light) and its magnitude is inversely proportional to the wavelength of the light, defined to be $2\pi/\lambda$, where $\lambda$, is the wavelength of the light. In this disclosure, only the radial component of the wave vector (parallel to the waveguide surface) is used. For example, a light for a projector is associated with a radial wave vector ($k_{r0}$) which has a magnitude of zero for a normal incidence on a surface of the output waveguide. Radial component does not change as the light enters or exits the medium (e.g. waveguide). A grating vector is a vector whose direction is normal to the grating grooves and its vector size is inversely proportional to its pitch. In some configurations, the grating vector ($k_{grating}$) is defined to be $2\pi/p$, where p is the pitch of the grating. Since grating (e.g. surface relief grating) is on the waveguide surface, the grating vector is always parallel to the surface, and thus it affects only the radial component of the wave vector of the image light. Accordingly, the radial component of the wave vector ($k_r$) of an image light bouncing back and forth in the output waveguide is changed to $k_r=k_{r0}\pm\Sigma k_{grating}$, where $\Sigma k_{grating}$ is a vector sum of the grating vectors associated with the gratings in a waveguide.

The output waveguide expands the image light in two dimensions. The output waveguide includes a second and third grating (that are associated with a second and third grating vector, respectively) that together direct and decouple the expanded image light from the output waveguide, the output expanded image light having a wave vector that matches the input wave vector. The output waveguide includes at least a first grating that receives the image light emitted from at least one of the one or more projectors and couples the received image light into the waveguide body, and the waveguide body expands the received image light in at least one dimension to transmit a first expanded image light. Each of the second grating and the third grating expands the first expanded image light along a different dimension to form a second expanded image light, and outputs the second expanded image light to an eyebox. The input diffraction grating, the second diffraction grating, and the third diffraction grating are designed such that the vector sum of all their associated grating vectors is less than a threshold value, and the threshold value is close to or equal to zero.

The orientation of each source assembly is determined by the controller based on the display instructions provided to the light source. Note that in some embodiments, the image light used in the waveguide display is polychromatic for each of the primary colors (red, green, and blue) with a finite bandwidth of wavelength. The display acts as a two-dimensional image projector with an extended pupil over two orthogonal dimensions.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1 is a diagram of a near-eye-display (NED) 100, in accordance with an embodiment. In some embodiments, the NED 100 may be referred to as a head-mounted display (HIVID). The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as a VR NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 is coupled to one or more optical elements which together display media to users. In some embodiments, the frame 105 may represent a frame of eye-wear glasses. The display 110 is configured for users to see the content presented by the NED 100. As discussed below in conjunction with FIG. 2, the display 110 includes at least one waveguide display assembly (not shown) for directing one or more image light to an eye of the user. The waveguide display assembly includes, e.g., a waveguide display, a stacked waveguide display, a varifocal waveguide display, or some combination thereof. The stacked waveguide display is a polychromatic display created by stacking waveguide displays whose respective monochromatic sources are of different colors. The stacked waveguide display is also a polychromatic display that can be projected on multiple planes (e.g. multi-planar display). The varifocal waveguide display is a display that can adjust a focal position of image light emitted from the waveguide display.

Figure 2:
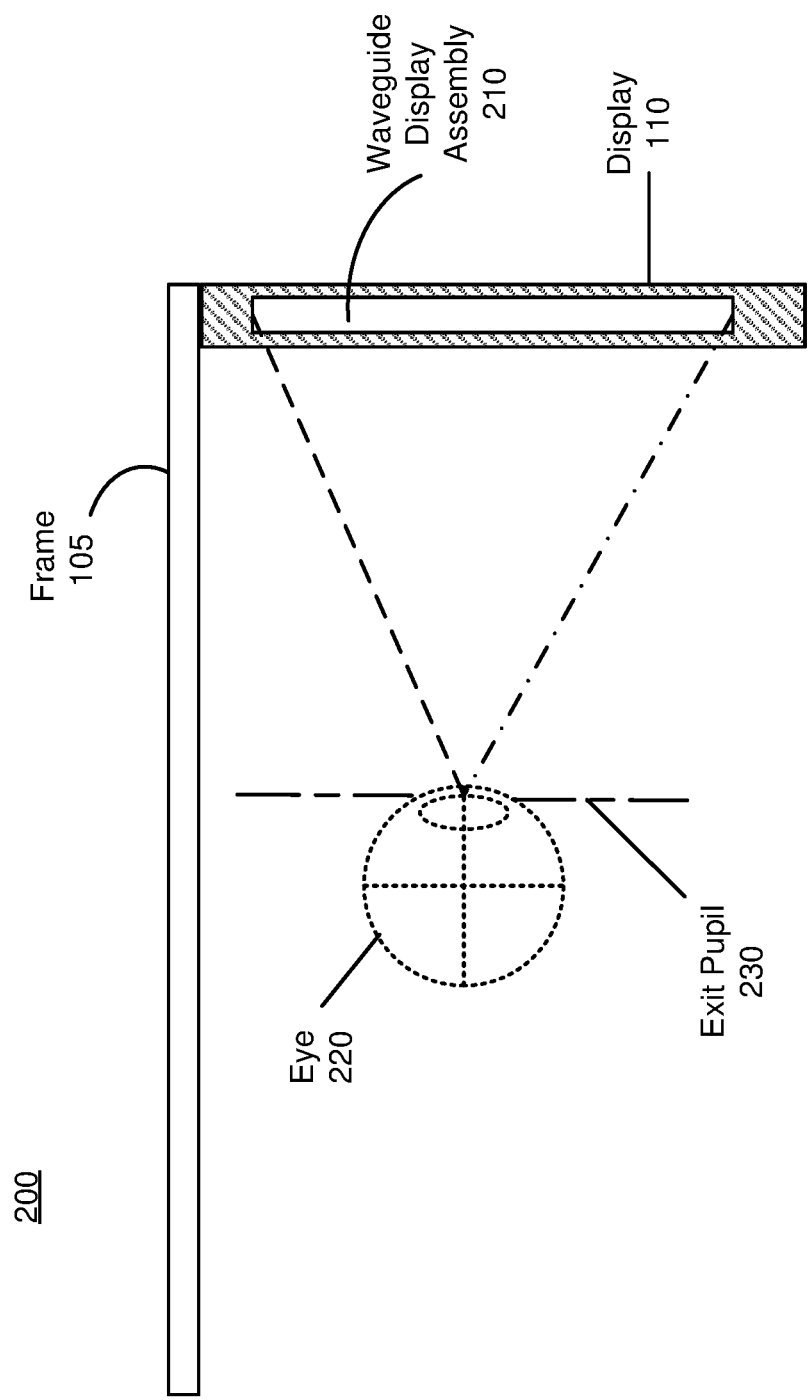
FIG. 2 is a cross-section of the NED illustrated in FIG. 1, in accordance with an embodiment.

FIG. 2 is a cross-section 200 of the NED 100 illustrated in FIG. 1, in accordance with an embodiment. The display 110 includes at least one waveguide display assembly 210. An exit pupil 230 is a location where the eye 220 is positioned in an eyebox region when the user wears the NED 100. For purposes of illustration, FIG. 2 shows the cross section 200 associated with a single eye 220 and a single waveguide display assembly 210, but in alternative embodiments not shown, another waveguide display assembly which is separate from the waveguide display assembly 210 shown in FIG. 2, provides image light to an eyebox located at an exit pupil of another eye 220 of the user.

The waveguide display assembly 210, as illustrated below in FIG. 2, is configured to direct the image light to an eyebox located at an exit pupil 230 of the eye 220. The waveguide display assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the waveguide display assembly 210 and the eye 220. The optical elements may act to, e.g., correct aberrations in image light emitted from the waveguide display assembly 210, magnify image light emitted from the waveguide display assembly 210, some other optical adjustment of image light emitted from the waveguide display assembly 210, or some combination thereof. The example for optical elements may include an aperture, a Fresnel lens, a convex lens, a concave lens, a filter, or any other suitable optical element that affects image light.

In some embodiments, the waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g. multi-planar colored display). In some configurations, the stacked waveguide display is a monochromatic display that can be projected on multiple planes (e.g. multi-planar monochromatic display). The varifocal waveguide display is a display that can adjust a focal position of image light emitted from the waveguide display. In alternate embodiments, the waveguide display assembly 210 may include the stacked waveguide display and the varifocal waveguide display.

Figure 3:
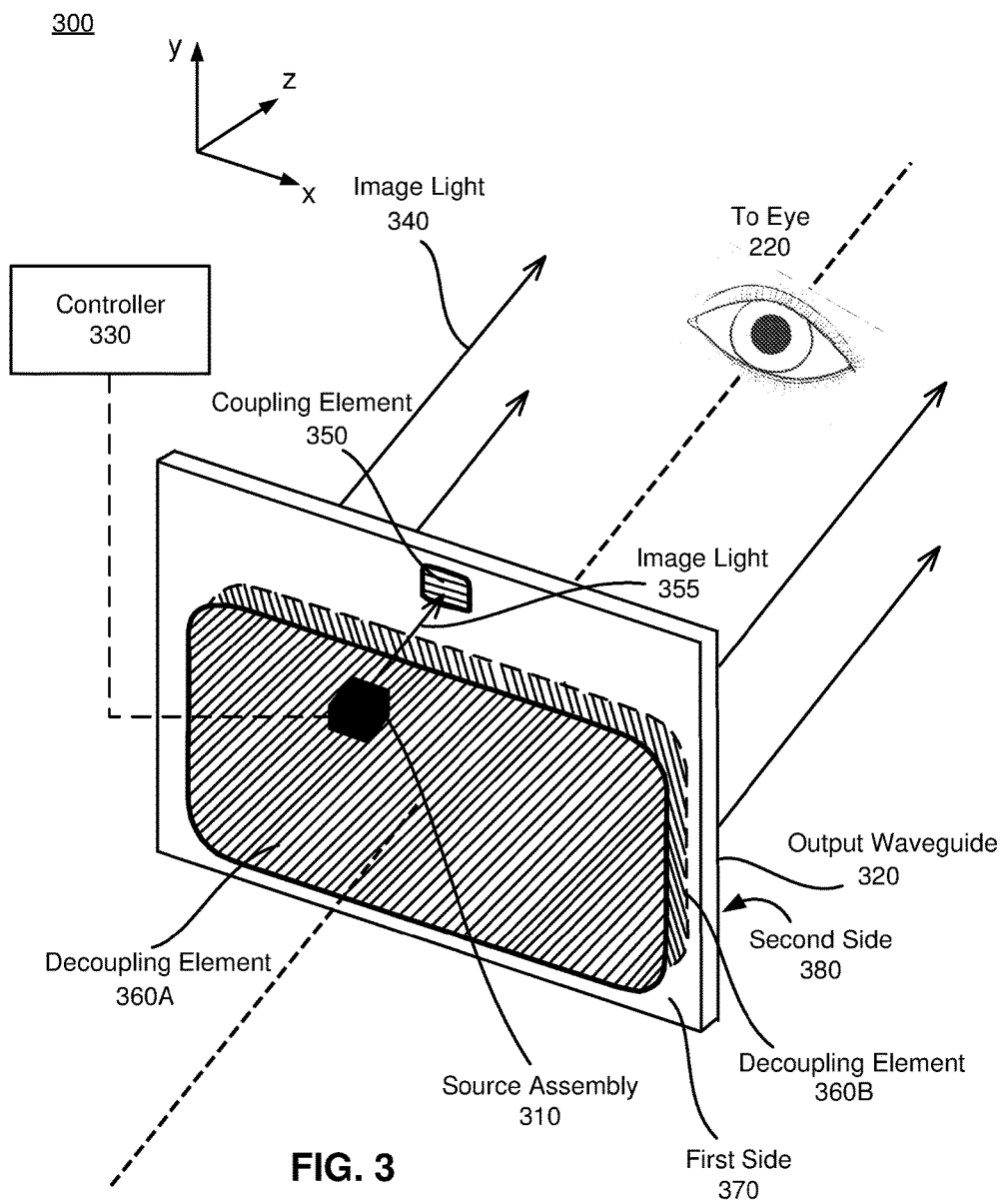
FIG. 3 illustrates an isometric view of a waveguide display with a single source assembly, in accordance with an embodiment.

FIG. 3 illustrates an isometric view of a waveguide display 300, in accordance with an embodiment. In some embodiments, the waveguide display 300 is a component (e.g., waveguide display assembly 210) of the NED 100. In alternate embodiments, the waveguide display 300 is part of some other NED, or other system that directs display image light to a particular location.

The waveguide display 300 includes a source assembly 310, an output waveguide 320, and a controller 330. For purposes of illustration, FIG. 3 shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye.

The source assembly 310 generates image light. The source assembly 310 includes an optical source, and an optics system (e.g., as further described below with regard to FIG. 4). The source assembly 310 generates and outputs image light 355 to a coupling element 350 located on a first side 370 of the output waveguide 320. The image light 355 propagates along a dimension with an input wave vector as described below with reference to FIG. 5C.

The output waveguide 320 is an optical waveguide that outputs image light to an eye 220 of a user. The output waveguide 320 receives the image light 355 at one or more coupling elements 350 located on the first side 370, and guides the received input image light to decoupling element 360A. In some embodiments, the coupling element 350 couples the image light 355 from the source assembly 310 into the output waveguide 320. The coupling element 350 may be, e.g., a diffraction grating, a holographic grating, one or more cascaded reflectors, one or more prismatic surface elements, an array of holographic reflectors, or some combination thereof. In some configurations, each of the coupling elements 350 have substantially the same area along the X-axis and the Y-axis dimension, and are separated by a distance along the Z-axis (e.g. on the first side 370 and the second side 380, or both on the first side 370 but separated with an interfacial layer (not shown), or on the second side 380 and separated with an interfacial layer or both embedded into the waveguide body of the output waveguide 320 but separated with the interface layer). The coupling element 350 has a first grating vector. The pitch of the coupling element 350 may be 300-600 nm.

The decoupling element 360A redirects the total internally reflected image light from the output waveguide 320 such that it may be decoupled via the decoupling element 360B. The decoupling element 360A is part of, or affixed to, the first side 370 of the output waveguide 320. The decoupling element 360B is part of, or affixed to, the second side 380 of the output waveguide 320, such that the decoupling element 360A is opposed to the decoupling element 360B. Opposed elements are opposite to each other on a waveguide. In some configurations, there may be an offset between the opposed elements. For example, the offset can be one quarter of the length of an opposed element. The decoupling elements 360A and 360B may be, e.g., a diffraction grating, or a holographic grating, one or more cascaded reflectors, one or more prismatic surface elements, an array of holographic reflectors. In some configurations, each of the decoupling elements 360A have substantially the same area along the X-axis and the Y-axis dimension, and are separated by a distance along the Z-axis (e.g. on the first side 370 and the second side 380, or both on the first side 370 but separated with an interfacial layer (not shown), or on the second side 380 and separated with an interfacial layer or both embedded into the waveguide body of the output waveguide 320 but separated with the interface layer). The decoupling element 360A has an associated second grating vector, and the decoupling element 360B has an associated third grating vector. An orientation and position of the image light exiting from the output waveguide 320 is controlled by changing an orientation and position of the image light 355 entering the coupling element 350. The pitch of the decoupling element 360A and/or the decoupling element 360B may be 300-600 nm. In some configurations, the coupling element 350 couples the image light into the output waveguide 320 and the image light propagates along one dimension. The decoupling element 360A receives image light from the coupling element 350 covering a first portion of the first angular range emitted by the source assembly 310 and diffracts the received image light to another dimension. Note that the received image light is expanded in 2D until this state. The decoupling element 360B diffracts a 2-D expanded image light toward the eyebox. In alternate configurations, the coupling element 350 couples the image light into the output waveguide 320 and the image light propagates along one dimension. The decoupling element 360B receives image light from the coupling element 350 covering a first portion of the first angular range emitted by the source assembly 310 and diffracts the received image light to another dimension. Note that the received image light is expanded in 2D until this stage. The decoupling element 360A diffracts a 2-D expanded image light toward the eyebox.

The coupling element 350, the decoupling element 360A, and the decoupling element 360B are designed such that a sum of their respective grating vectors is less than a threshold value, and the threshold value is close to or equal to zero. Accordingly, the image light 355 entering the output waveguide 320 is propagating in the same direction when it is output as image light 340 from the output waveguide 320. Moreover, in alternate embodiments, additional coupling elements and/or de-coupling elements may be added. And so long as the sum of their respective grating vectors is less than the threshold value, the image light 355 and the image light 340 propagate in the same direction. The location of the coupling element 350 relative to the decoupling element 360A and the decoupling element 360B as shown in FIG. 3 is only an example. In other configurations, the location could be on any other portion of the output waveguide 320 (e.g. a top edge of the first side 370, a bottom edge of the first side 370). In some embodiments, the waveguide display 300 includes a plurality of source assemblies 310 and/or a plurality of coupling elements 350 to increase the FOV and/or eyebox further.

The output waveguide 320 includes a waveguide body with the first side 370 and a second side 380 that are opposite to each other. In the example of FIG. 3, the waveguide body includes the two opposite sides—the first side 370 and the second side 380, each of the opposite sides representing a plane along the X-dimension and Y-dimension. The output waveguide 320 may be composed of one or more materials that facilitate total internal reflection of the image light 355. The output waveguide 320 may be composed of e.g., silicon, plastic, glass, or polymers, or some combination thereof. The output waveguide 320 has a relatively small form factor. For example, the output waveguide 320 may be approximately 50 mm wide along X-dimension, 30 mm long along Y-dimension and 0.3-1 mm thick along Z-dimension.

The controller 330 controls the scanning operations of the source assembly 310. The controller 330 determines display instructions for the source assembly 310. The display instructions are generated based at least on the one or more display instructions generated by the controller 330. Display instructions are instructions to render one or more images. In some embodiments, display instructions may simply be an image file (e.g., bitmap). The display instructions may be received from, e.g., a console of a system (e.g., as described below in conjunction with FIG. 13). Display instructions are instructions used by the source assembly 310 to generate image light 340. The display instructions may include, e.g., a type of a source of image light (e.g. monochromatic, polychromatic), a scanning rate, an orientation of a scanning apparatus, one or more illumination parameters (described below with reference to FIG. 4), or some combination thereof. The controller 330 includes a combination of hardware, software, and/or firmware not shown here so as not to obscure other aspects of the disclosure.

In alternate configurations (not shown), the output waveguide 320 includes the coupling element 350 on the first side 370 and a second coupling element (not shown here) on the second side 380. The coupling element 350 receives an image light 355 from the source assembly 310. The coupling element on the second side 380 receives an image light from the source assembly 310 and/or a different source assembly. The controller 330 determines the display instructions for the source assembly 310 based at least on the one or more display instructions.

In alternate configurations, the output waveguide 320 may be oriented such that the source assembly 310 generates the image light 355 propagating along an input wave vector in the Z-dimension. The output waveguide 320 outputs the image light 340 propagating along an output wave vector that matches the input wave vector. In some configurations, the image light 340 is a monochromatic image light that can be projected on multiple planes (e.g. multi-planar monochromatic display). In alternate configurations, the image light 340 is a polychromatic image light that can be projected on multiple planes (e.g. multi-planar polychromatic display).

In some embodiments, the output waveguide 320 outputs the expanded image light 340 to the user's eye 220 with a very large FOV. For example, the expanded image light 340 provided to the user's eye 220 with a diagonal FOV (in x and y) of at least 60 degrees. The output waveguide 320 is configured to provide an eyebox of with a length of at least 20 mm and a width of at least 10 mm. Generally, the horizontal FOV is larger than the vertical FOV. If the aspect ratio is 16:9, the product of the horizontal FOV and the vertical FOV will be ~52×30 degrees whose diagonal FOV is 60 degrees for instance.

Figure 4:
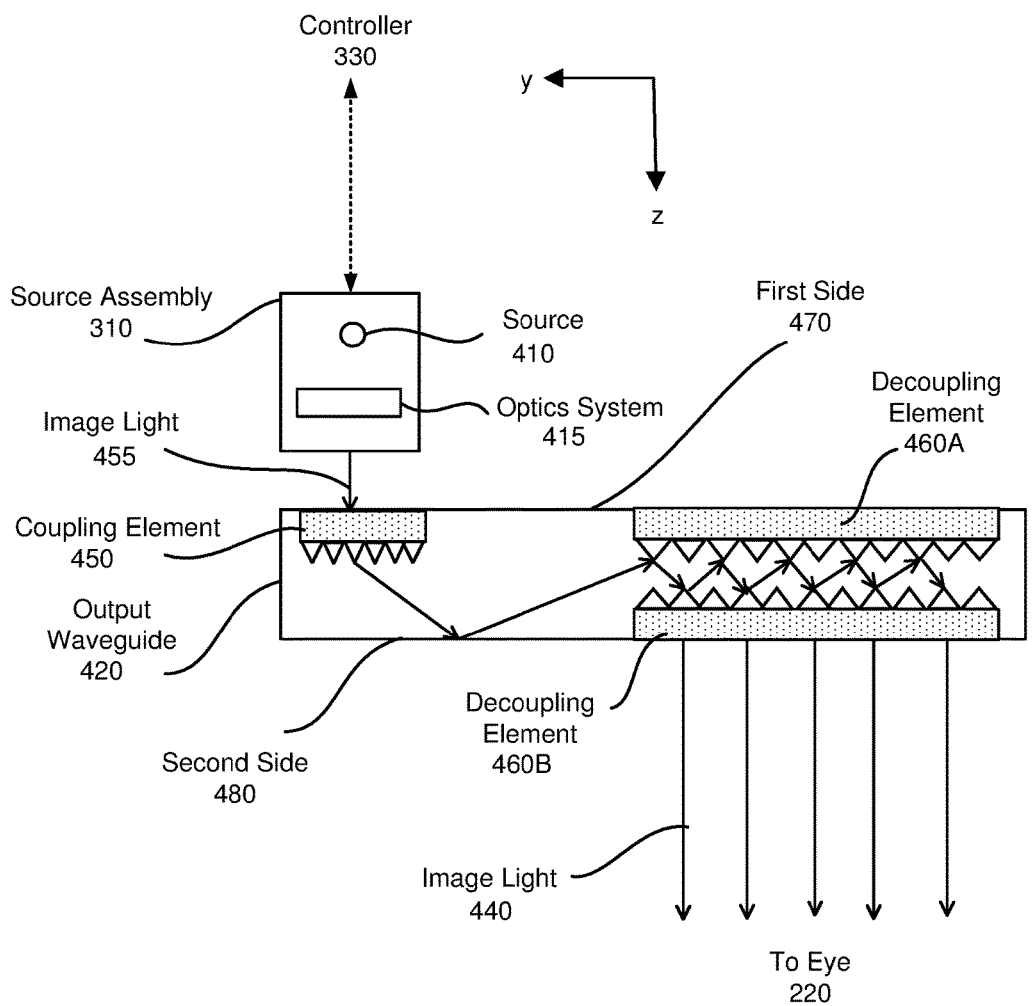
FIG. 4 illustrates a cross-section of the waveguide display, in accordance with an embodiment.

FIG. 4 illustrates a cross section 400 of the waveguide display 300, in accordance with an embodiment. The cross section 400 of the waveguide display 300 includes the source assembly 310 and an output waveguide 420.

The source assembly 310 generates light in accordance with display instructions from the controller 330. The source assembly 310 includes a source 410, and an optics system 415. The source 410 is a source of light that generates at least a coherent or partially coherent image light. The source 410 may be, e.g., laser diode, a vertical cavity surface emitting laser, a light emitting diode, a tunable laser, a MicroLED, a superluminous LED (SLED), or some other light source that emits coherent or partially coherent light. The source 410 emits light in a visible band (e.g., from about 390 nm to 700 nm), and it may emit light that is continuous or pulsed. In some embodiments, the source 410 may be a laser that emits light at a particular wavelength (e.g., 532 nanometers). The source 410 emits light in accordance with one or more illumination parameters received from the controller 330. An illumination parameter is an instruction used by the source 410 to generate light. An illumination parameter may include, e.g., restriction of input wave vector for total internal reflection, restriction of input wave vector for maximum angle, source wavelength, pulse rate, pulse amplitude, beam type (continuous or pulsed), other parameter(s) that affect the emitted light, or some combination thereof.

The optics system 415 includes one or more optical components that condition the light from the source 410. Conditioning light from the source 410 may include, e.g., expanding, collimating, adjusting orientation in accordance with instructions from the controller 330, some other adjustment of the light, or some combination thereof. The one or more optical components may include, e.g., lenses, liquid lens, mirrors, apertures, gratings, or some combination thereof. In some configurations, the optics system 415 includes liquid lens with a plurality of electrodes that allows scanning a beam of light with a threshold value of scanning angle in order to shift the beam of light to a region outside the liquid lens. In an alternate configuration, the optics system 415 includes a voice coil motor that performs one dimensional scanning of the light to a threshold value of scanning angle. The voice coil motor performs a movement of one or more lens to change a direction of the light outside the one or more lens in order to fill in the gaps between each of the multiple lines scanned. Light emitted from the optics system 415 (and also the source assembly 310) is referred to as image light 455. The optics system 415 outputs the image light 455 at a particular orientation (in accordance with the display instructions) toward the output waveguide 420. The image light 455 propagates along an input wave vector such that the restrictions for both total internal reflection and maximum angle of propagation are met.

The output waveguide 420 receives the image light 455. The coupling element 450 at the first side 470 couples the image light 455 from the source assembly 310 into the output waveguide 420. In embodiments where the coupling element 450 is diffraction grating, the pitch of the diffraction grating is chosen such that total internal reflection occurs, and the image light 455 propagates internally toward the decoupling element 460A. For example, the pitch of the coupling element 450 may be in the range of 300 nm to 600 nm. In alternate embodiments, the coupling element 450 is located at the second side 480 of the output waveguide 420.

The decoupling element 460A redirects the image light 455 toward the decoupling element 460B for decoupling from the output waveguide 420. In embodiments where the decoupling element 460A and 460B is a diffraction grating, the pitch of the diffraction grating is chosen to cause incident image light 455 to exit the output waveguide 420 at a specific angle of inclination to the surface of the output waveguide 420. An orientation of the image light exiting from the output waveguide 420 may be altered by varying the orientation of the image light exiting the source assembly 310, varying an orientation of the source assembly 310, or some combination thereof. For example, the pitch of the diffraction grating may be in the range of 300 nm to 600 nm. The coupling element 450, the decoupling element 460A and the decoupling element 460B are designed such that a sum of their respective grating vectors is less than a threshold value, and the threshold value is close to or equal to zero.

In some configurations, the first decoupling element 460A receives the image light 455 from the coupling element 450 after total internal reflection in the waveguide body and transmits an expanded image light to the second decoupling element 460B at the second side 480. The second decoupling element 460B decouples the expanded image light 440 from the second side 480 of the output waveguide 420 to the user's eye 220. The first decoupling element 460A and the second decoupling element 460B are structurally similar. In alternate configurations, the second decoupling element 460B receives the image light 455 after total internal reflection in the waveguide body and transmits an expanded image light from the first decoupling element 460A on the first side 470.

The image light 440 exiting the output waveguide 420 is expanded at least along two dimension (e.g., may be elongated along X-dimension). The image light 440 couples to the human eye 220. The image light 440 exits the output waveguide 420 such that a sum of the respective grating vectors of each of the coupling element 450, the decoupling element 460A, and the decoupling element 460B is less than a threshold value, and the threshold value is close to or equal to zero. An exact threshold value is going to be system specific, however, it should be small enough to not degrade image resolution beyond acceptable standards (if non-zero dispersion occurs and resolution starts to drop). In some configurations, the image light 440 propagates along wave vectors along at least one of X-dimension, Y-dimension, and Z-dimension.

In alternate embodiments, the image light 440 exits the output waveguide 420 via the decoupling element 460A. Note the decoupling elements 460A and 460B are larger than the coupling element 450, as the image light 440 is provided to an eyebox located at an exit pupil of the waveguide display.

In another embodiment, the waveguide display includes two or more decoupling elements. For example, the decoupling element 460A may include multiple decoupling elements located side by side with an offset. In another example, the decoupling element 460A may include multiple decoupling elements stacked together to create a two-dimensional decoupling element.

The controller 330 controls the source assembly 310 by providing display instructions to the source assembly 310. The display instructions cause the source assembly 310 to render light such that image light exiting the decoupling element 460A of the output waveguide 420 scans out one or more 2D images. For example, the display instructions may cause the source assembly 310 (via adjustments to optical elements in the optics system 415) to scan out an image in accordance with a scan pattern (e.g., raster, interlaced, etc.). The display instructions control an intensity of light emitted from the source 410, and the optics system 415 scans out the image by rapidly adjusting orientation of the emitted light. If done fast enough, a human eye integrates the scanned pattern into a single 2D image.

A collimated beam of image light has one or more physical properties, including, but not restricted to, wavelength, luminous intensity, flux, etc. The wavelength of collimated beam of image light from a source assembly strongly impacts, among several other parameters, the FOV of the NED 100. The FOV would be very small in cases where a source assembly emits image light across an entire visible band of image light. However, the waveguide display 300 has a relatively large FOV as the waveguide display includes a mono-chromatic source in the example shown in FIG. 4. Accordingly, to generate a polychromatic display that has a large FOV, one or more monochromatic waveguide displays (with one or more image light at different wavelengths) are stacked to generate a single polychromatic stacked waveguide display.

The waveguide display of FIG. 4 shows an example with a single output waveguide 420 receiving a monochromatic beam of image light 455 from the source assembly 310. In alternate embodiments, the waveguide display 300 includes a plurality of source assemblies 310 and a plurality of output waveguides 420. Each of the source assemblies 310 emits a monochromatic image light of a specific band of wavelength corresponding to one of the primary colors (red, green, and blue). Each of the output waveguides 420 may be stacked together with a distance of separation to output an expanded image light 440 that is multi-colored. The output waveguides are stacked such that image light (e.g., 440) from each of the stacked waveguides occupies a same area of the exit pupil of the stacked waveguide display. For example, the output waveguides may be stacked such that decoupling elements from adjacent optical waveguides are lined up and light from a rear output waveguide would pass through the decoupling element of the waveguide adjacent to and in front of the rear output waveguide. In some configurations, the expanded image light 440 can couple to the user's eye 220 as a multi-planar display. For example, the expanded image light 440 may include a display along at least two different depths along the Z-dimension.

In alternate embodiments, the location of the coupling element 450 can be located on the second side 480. In some configurations, the waveguide display of FIG. 4 may perform a scanning operation of the source 410 inside the source assembly 310 to form a line image. The location of the coupling element 450 shown in FIG. 4 is only an example, and several other arrangements are apparent to one of ordinary skill in the art.

Figure 5A:
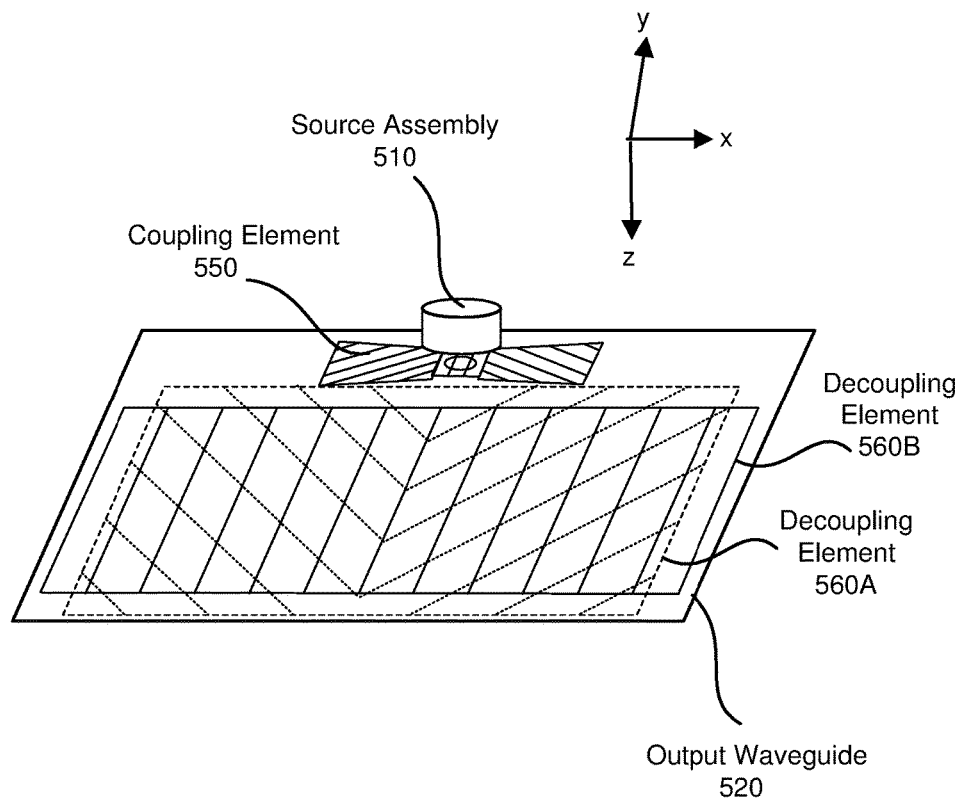
FIG. 5A illustrates an isometric view of a first design of the waveguide display shown in FIG. 4, in accordance with an embodiment.

FIG. 5A illustrates an isometric view 500 of a first design of the waveguide display shown in FIG. 4, in accordance with an embodiment. The isometric view 500 includes the source assembly 510 and an output waveguide 520. The source assembly 510 generates image light, and provides the image light to the output waveguide 520.

The output waveguide 520 is an optical waveguide that outputs image light to an eye 220 of a user. The output waveguide 520 receives image light from the source assembly 510 at one or more coupling elements 550, and guides the received input image light to the decoupling element 560A. The coupling element 550 couples the image light from the source assembly 510 into the output waveguide 520. The coupling element 550 may be, e.g., a diffraction grating, a holographic grating, or some combination thereof. The coupling element 550 has a first grating vector. The pitch of the coupling element 550 may be 300-600 nm.

In one configuration, the first design of the waveguide display provides a horizontal field of view of 51.0 degrees, a vertical field of view of 31.9 degrees, and a diagonal field of view of 60.1 degrees. In another configuration, the coupling element 550 includes a pitch in the range of 0.3 to 0.6 micron, and the decoupling elements 560A and 560B include a pitch in the range of 0.3 to 0.6 micron.

Figure 5B:
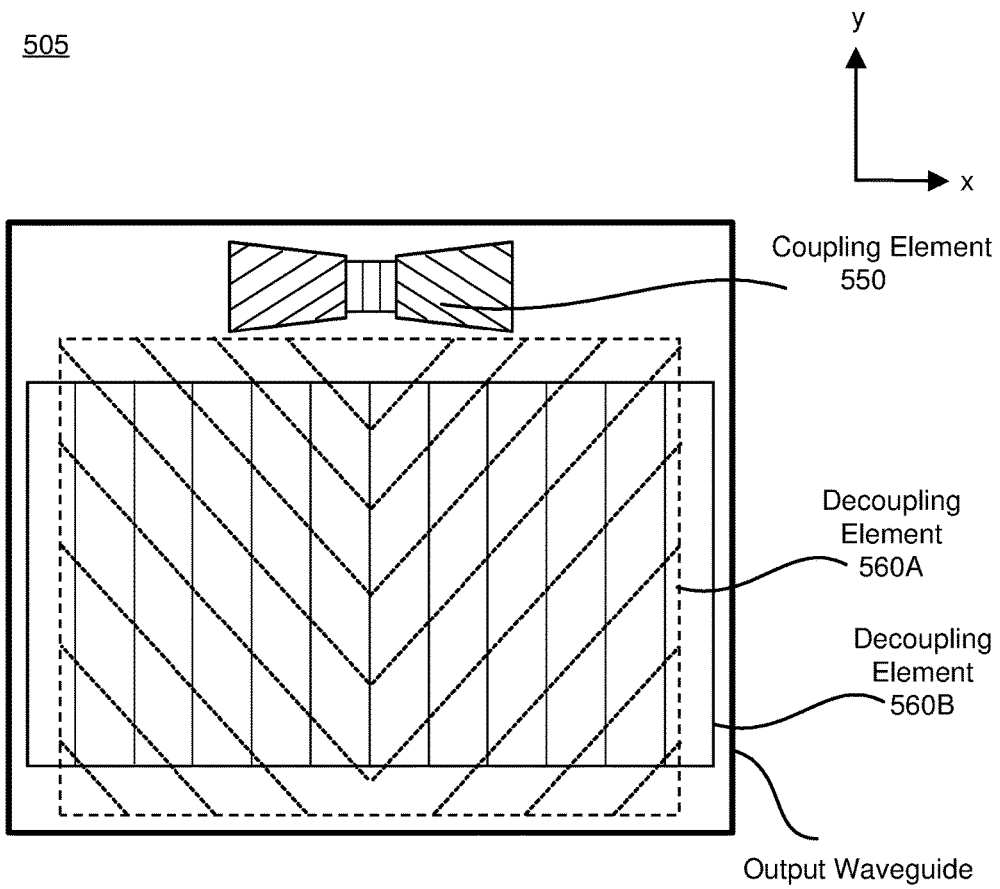
FIG. 5B illustrates a top view of the first design of the waveguide display shown in FIG. 4, in accordance with an embodiment.

FIG. 5B illustrates a top view 505 of the first design of the waveguide display shown in FIG. 4, in accordance with an embodiment. The top view 505 includes the coupling element 550, the decoupling element 560A, and the decoupling element 560B of the output waveguide 520.

Figure 5C:
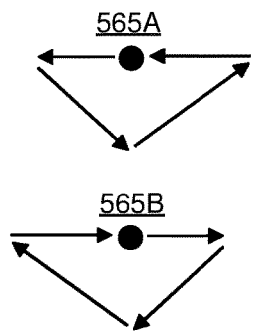
FIG. 5C illustrates an example path of grating vectors associated with a plurality of diffraction gratings of the first design of the waveguide display shown in FIG. 4, in accordance with an embodiment.

FIG. 5C illustrates an example path 515 of grating vectors associated with a plurality of diffraction gratings of the first design of the waveguide display shown in FIG. 4, in accordance with an embodiment. The example path 515 is a path of a wave vector of the image light that is affected by the grating vectors of the coupling element 550, the first decoupling element 560A, and the second decoupling element 560B that the image light meets. The grating vectors are just added to change the path of the wave vector. In the example path 515, image light from the source assembly (not shown here) is associated with a projected radial wave vector (not shown). The image light is coupled into the output waveguide 520 via the coupling element 550 associated with an input grating vector (not shown). The in-coupled light is then diffracted by the first decoupling element 560A associated with a first grating vector (not shown). The light is then diffracted (and out coupled from the output waveguide 520) by the second decoupling element 560B associated with a second grating vector (not shown). In one embodiment, the example path 515 includes a summation point 565A. The summation of the input grating vector, the first grating vector, and the second grating vector at the summation point 565A is zero. In a second embodiment, the example path 515 includes a summation point 565B. The summation of the input grating vector, the first grating vector, and the second grating vector at the summation point 565B is zero.

Figure 5D:
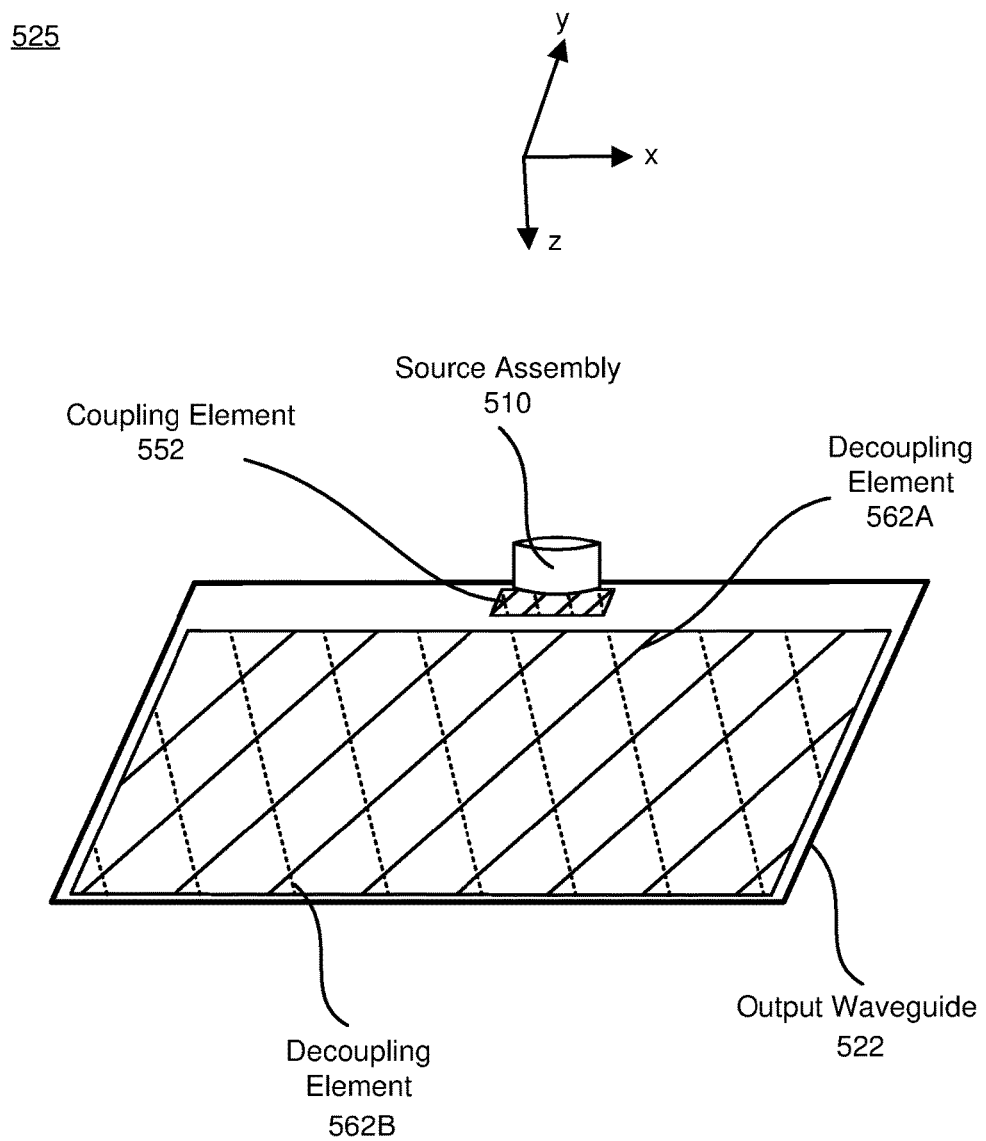
FIG. 5D illustrates an isometric view of a second design of the waveguide display shown in FIG. 4, in accordance with an embodiment.

FIG. 5D illustrates an isometric view 525 of a second design of the waveguide display shown in FIG. 4, in accordance with an embodiment. The isometric view 525 includes the source assembly 510 and an output waveguide 522. The source assembly 510 generates image light, and provides the image light to the output waveguide 522.

The output waveguide 522 is an optical waveguide that outputs image light to an eye 220 of a user. The output waveguide 522 receives image light from the source assembly 510 at one or more coupling elements 552, and guides the received input image light to the decoupling element 562A or the decoupling element 562B. The coupling element 552 couples the image light from the source assembly 510 into the output waveguide 522. The coupling element 552 may be, e.g., a diffraction grating, a holographic grating, or some combination thereof. The coupling element 552 has a first grating vector. The pitch of the coupling element 552 may be 300-600 nm.

Figure 5E:
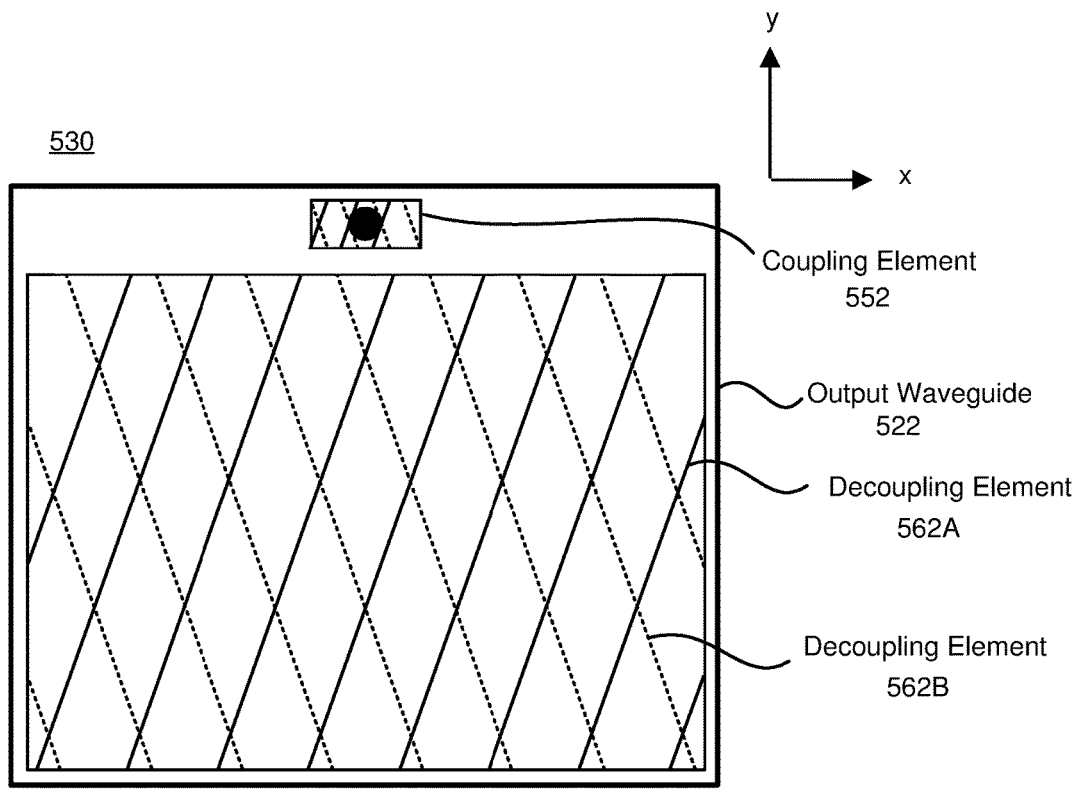
FIG. 5E illustrates a top view of the second design of the waveguide display shown in FIG. 4, in accordance with an embodiment.

FIG. 5E illustrates a top view 530 of the second design of the waveguide display shown in FIG. 4, in accordance with an embodiment. The top view 530 includes the coupling element 552, the decoupling element 562A, and the decoupling element 562B of the output waveguide 522.

Figure 5F:
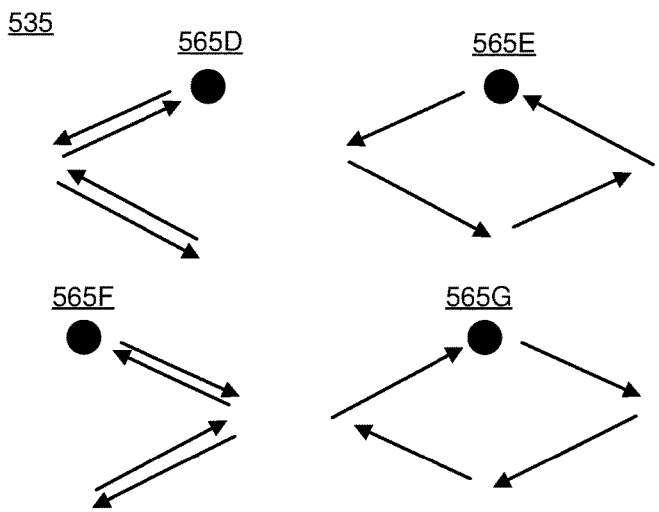
FIG. 5F illustrates an example path of grating vectors associated with a plurality of diffraction gratings of the second design of the waveguide display shown in FIG. 4, in accordance with an embodiment.

FIG. 5F illustrates an example path 535 of grating vectors associated with a plurality of diffraction gratings of the second design of the waveguide display shown in FIG. 4, in accordance with an embodiment. The example path 535 is a path of a wave vector of the image light that is affected by the grating vectors of the coupling element 552, the first decoupling element 562A, and the second decoupling element 562B that the image light meets. The grating vectors are just added to change the path of the wave vector. In the example path 535, image light from the source assembly (not shown here) is associated with a projected radial wave vector (not shown). The image light is coupled into the output waveguide 522 via the coupling element 552 associated with an input grating vector (not shown). The in-coupled light is then diffracted by the first decoupling element 562A associated with a first grating vector (not shown). The light is then diffracted (and out coupled from the output waveguide 522) by the second decoupling element 562B associated with a second grating vector (not shown). In alternate configurations, the image light is coupled into the output waveguide 522 via the coupling element 552 associated with an input grating vector (not shown). The in-coupled light is then diffracted by the second decoupling element 562B associated with a first grating vector (not shown). The light is then diffracted (and out coupled from the output waveguide 522) by the first decoupling element 562A associated with a second grating vector (not shown). In one embodiment, the example path 535 includes a summation point 565D. The summation point 565D corresponds to the sum of the k-vectors in the order corresponding to: a grating vector associated with the coupling element 552, a grating vector associated with the decoupling element 562A, the grating vector associated with the decoupling element 562A, and the grating vector associated with the decoupling element 562B. In a second embodiment, the example path 535 includes a summation point 565E. The summation point 565E corresponds to the sum of the k-vectors in the order corresponding to: the grating vector associated with the coupling element 552, a grating vector associated with the decoupling element 562A, the grating vector associated with the decoupling element 562B, and the grating vector associated with the decoupling element 562A. In a third embodiment, the example path 535 includes a summation point 565F. The summation point 565F corresponds to the sum of the k-vectors in the order corresponding to: a grating vector associated with the coupling element 552, a grating vector associated with the decoupling element 562B, the grating vector associated with the decoupling element 562B, and the grating vector associated with the decoupling element 562A. In a fourth embodiment, the example path 535 includes a summation point 565G. The summation point 565G corresponds to the sum of the k-vectors in the order corresponding to: a grating vector associated with the coupling element 552, a grating vector associated with the decoupling element 562B, the grating vector associated with the decoupling element 562A, and the grating vector associated with the decoupling element 562B.

Figure 5G:
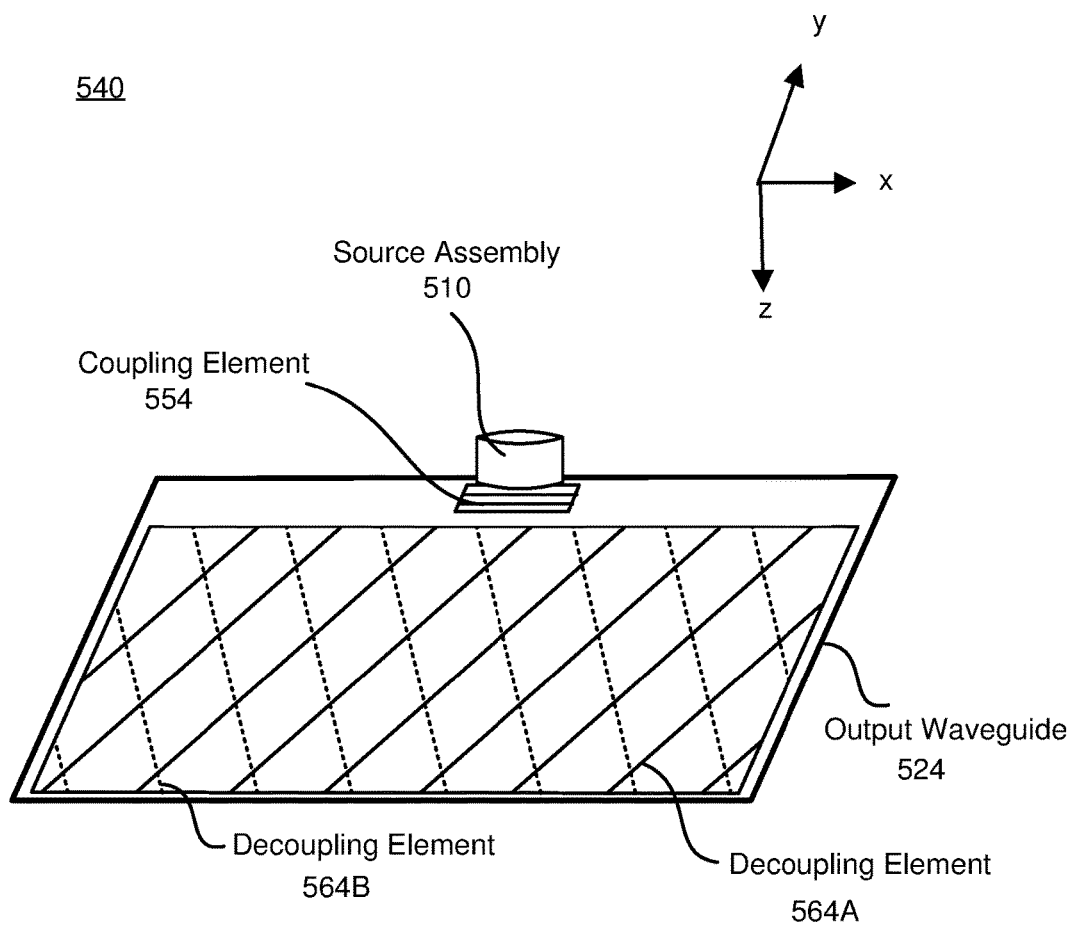
FIG. 5G illustrates an isometric view of a third design of the waveguide display shown in FIG. 4, in accordance with an embodiment.

FIG. 5G illustrates an isometric view of a third design of the waveguide display shown in FIG. 4, in accordance with an embodiment. The isometric view 540 includes the source assembly 510 and an output waveguide 524. The source assembly 510 generates image light, and provides the image light to the output waveguide 524.

The output waveguide 524 is an optical waveguide that outputs image light to an eye 220 of a user. The output waveguide 524 receives image light from the source assembly 510 at one or more coupling elements 554, and guides the received input image light to the decoupling element 564A. The coupling element 554 couples the image light from the source assembly 510 into the output waveguide 524. The coupling element 554 may be, e.g., a diffraction grating, a holographic grating, or some combination thereof. The coupling element 554 has a first grating vector. The pitch of the coupling element 554 may be 300-600 nm.

Figure 5H:
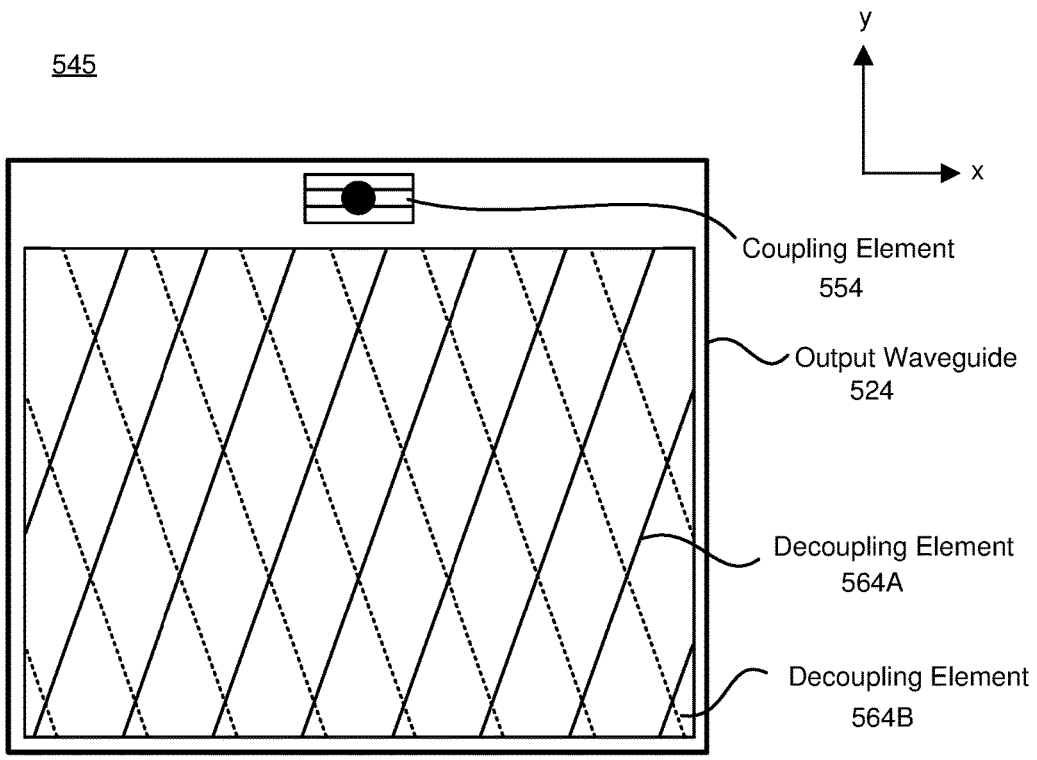
FIG. 5H illustrates a top view of the third design of the waveguide display shown in FIG. 4, in accordance with an embodiment.

FIG. 5H illustrates a top view 545 of the third design of the waveguide display shown in FIG. 4, in accordance with an embodiment. The top view 545 includes the coupling element 554, the decoupling element 564A, and the decoupling element 564B of the output waveguide 524.

Figure 5I:
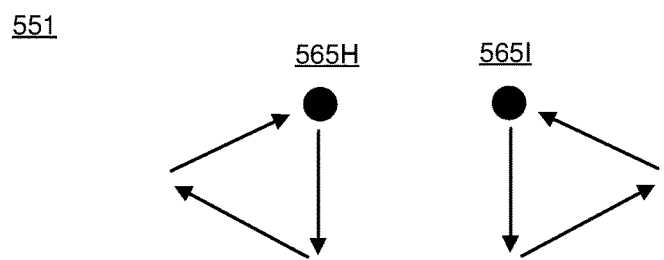
FIG. 5I illustrates an example path of grating vectors associated with a plurality of diffraction gratings of the third design of the waveguide display shown in FIG. 4, in accordance with an embodiment.

FIG. 5I illustrates an example path 551 of grating vectors associated with a plurality of diffraction gratings of the third design of the waveguide display shown in FIG. 4, in accordance with an embodiment. The example path 551 is a path of a wave vector of the image light that is affected by the grating vectors of the coupling element 554, the first decoupling element 564A, and the second decoupling element 564B that the image light meets. The grating vectors are just added to change the path of the wave vector. In the example path 551, image light from the source assembly (not shown here) is associated with a projected radial wave vector (not shown). The image light is coupled into the output waveguide 524 via the coupling element 554 associated with an input grating vector (not shown). The in-coupled light is then diffracted by the first decoupling element 564A associated with a first grating vector (not shown). The light is then diffracted (and out coupled from the output waveguide 524) by the second decoupling element 564B associated with a second grating vector (not shown). In one embodiment, the example path 551 includes a summation point 565H. The summation of the input grating vector, the first grating vector, and the second grating vector at the summation point 565H is zero. In a second embodiment, the example path 551 includes a summation point 565I. The summation point 565I corresponds to the sum of the k-vectors in the order corresponding to: a grating vector associated with the coupling element 554, a grating vector associated with the decoupling element 564B, and the grating vector associated with the decoupling element 564A. The summation of the input grating vector, the first grating vector, and the second grating vector at the summation point 565I is zero.

Figure 5J:
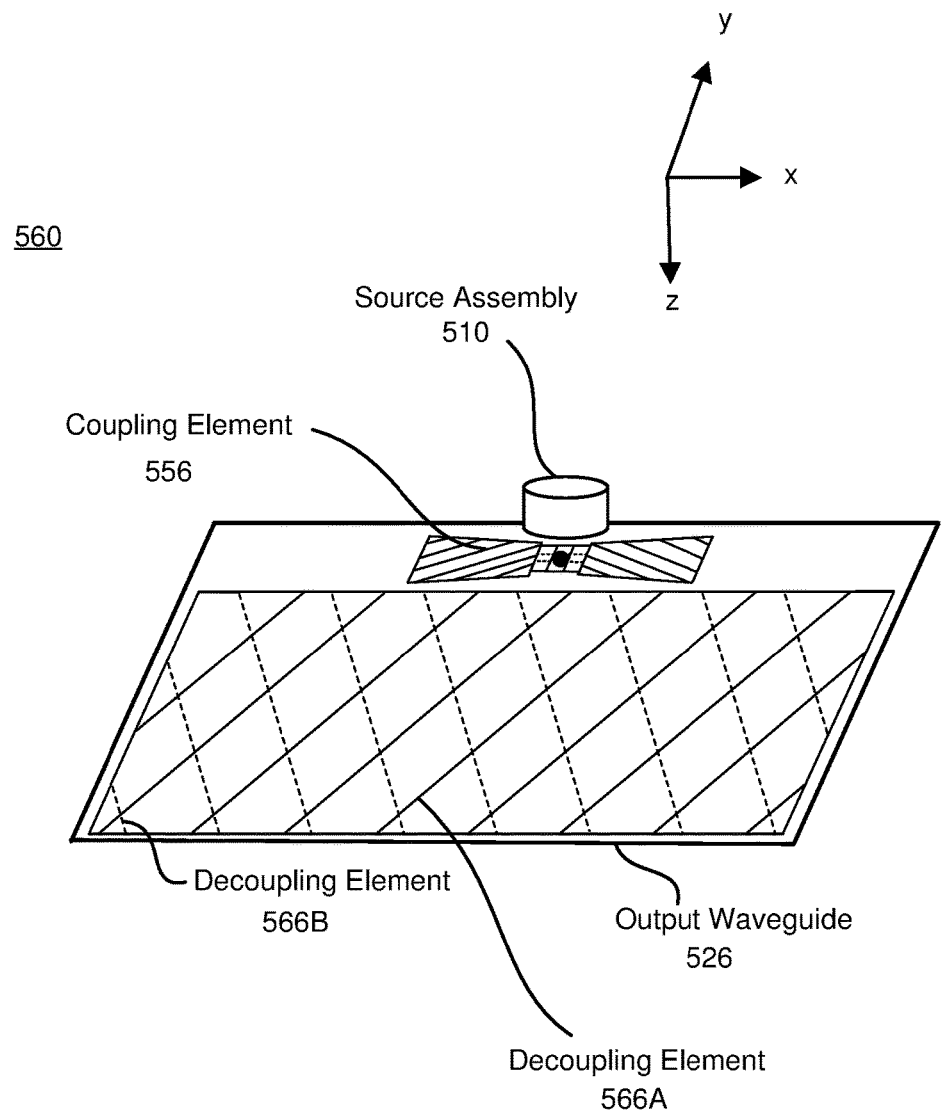
FIG. 5J illustrates an isometric view of a fourth design of the waveguide display shown in FIG. 4, in accordance with an embodiment.

FIG. 5J illustrates an isometric view 560 of a fourth design of the waveguide display shown in FIG. 4, in accordance with an embodiment. The isometric view 560 includes the source assembly 510 and an output waveguide 526. The source assembly 510 generates image light, and provides the image light to the output waveguide 526.

The output waveguide 526 is an optical waveguide that outputs image light to an eye 220 of a user. The output waveguide 526 receives image light from the source assembly 510 at one or more coupling elements 556, and guides the received input image light to the decoupling element 566A. The coupling element 556 couples the image light from the source assembly 510 into the output waveguide 526. The coupling element 556 may be, e.g., a diffraction grating, a holographic grating, or some combination thereof. The coupling element 556 has a first grating vector. The pitch of the coupling element 556 may be 300-600 nm.

Figure 5K:
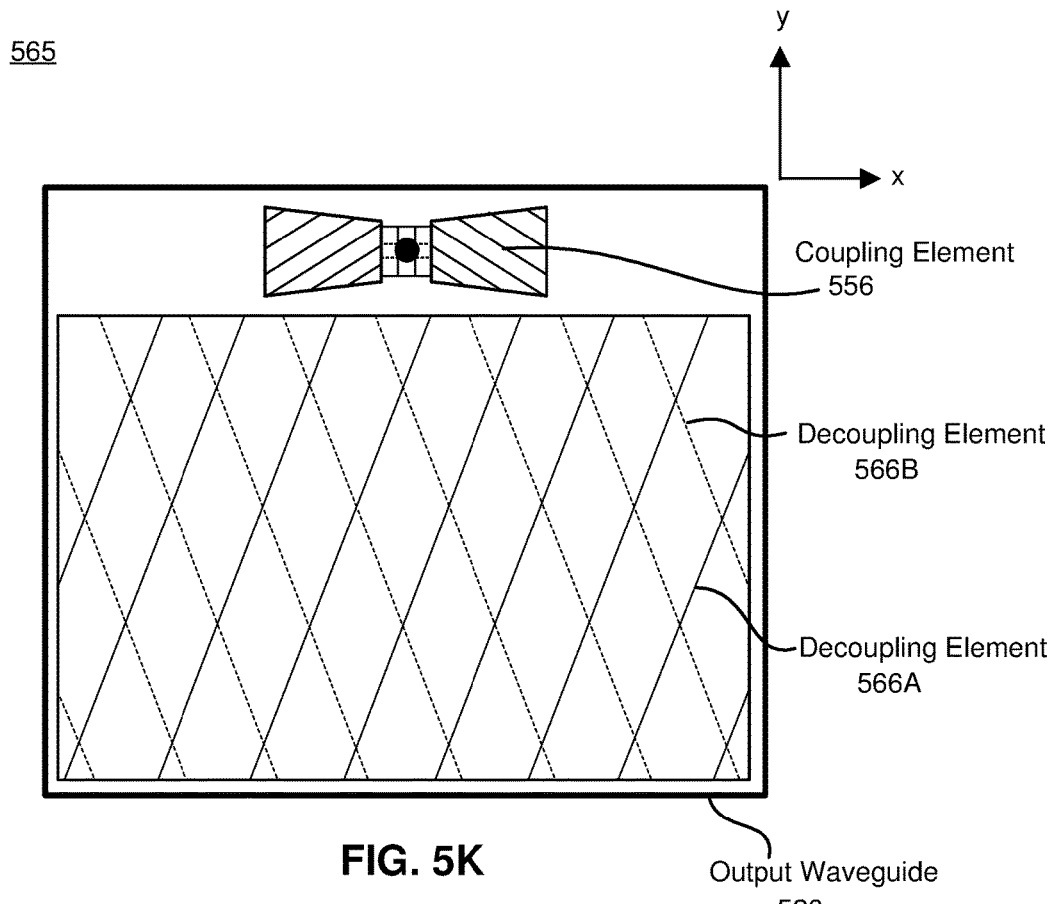
FIG. 5K illustrates a top view of the fourth design of the waveguide display shown in FIG. 4, in accordance with an embodiment.

FIG. 5K illustrates a top view 565 of the fourth design of the waveguide display shown in FIG. 4, in accordance with an embodiment. The top view 565 includes the coupling element 556, the decoupling element 566A, and the decoupling element 566B of the output waveguide 526.

Figure 5L:
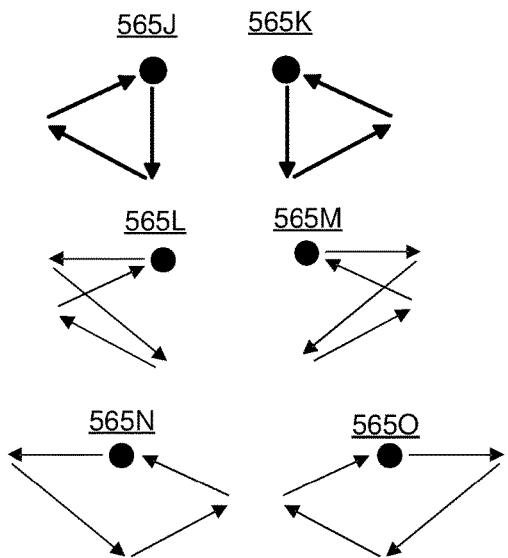
FIG. 5L illustrates an example path of grating vectors associated with a plurality of diffraction gratings of the fourth design of the waveguide display shown in FIG. 4, in accordance with an embodiment.

FIG. 5L illustrates an example path 570 of grating vectors associated with a plurality of diffraction gratings of the fourth design of the waveguide display shown in FIG. 4, in accordance with an embodiment. The example path 570 is a path of a wave vector of the image light that is affected by the grating vectors of the coupling element 556, the first decoupling element 566A, and the second decoupling element 566B that the image light meets. The grating vectors are just added to change the path of the wave vector. In the example path 570, image light from the source assembly (not shown here) is associated with a projected radial wave vector (not shown). The image light is coupled into the output waveguide 526 via the coupling element 556 associated with an input grating vector (not shown). The in-coupled light is then diffracted by the first decoupling element 566A associated with a first grating vector (not shown). The light is then diffracted (and out coupled from the output waveguide 526) by the second decoupling element 566B associated with a second grating vector (not shown). In one embodiment, the example path 570 includes a summation point 565J. The summation of the input grating vector, the first grating vector, and the second grating vector at the summation point 565J is zero. In a second embodiment, the example path 570 includes a summation point 565K. The summation point 565K corresponds to the sum of the k-vectors in the order corresponding to: a grating vector associated with the coupling element 556, a grating vector associated with the decoupling element 566B, and the grating vector associated with the decoupling element 566A. The summation of the input grating vector, the first grating vector, and the second grating vector at the summation point 565K is zero.

Figure 5M:
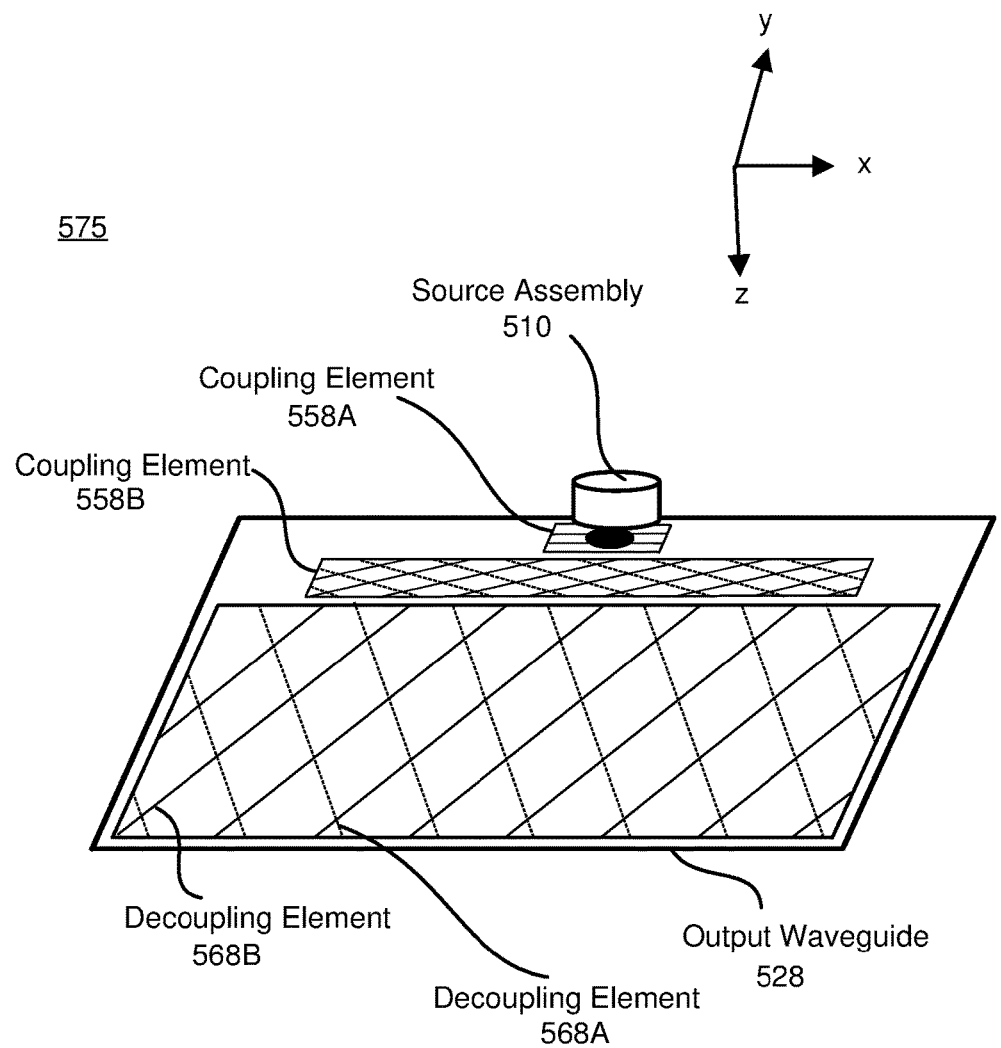
FIG. 5M illustrates an isometric view of a fifth design of the waveguide display shown in FIG. 4, in accordance with an embodiment.

FIG. 5M illustrates an isometric view 575 of a fifth design of the waveguide display shown in FIG. 4, in accordance with an embodiment. The isometric view 575 includes the source assembly 510 and an output waveguide 528. The source assembly 510 generates image light, and provides the image light to the output waveguide 528.

The output waveguide 528 is an optical waveguide that outputs image light to an eye 220 of a user. The output waveguide 528 receives image light from the source assembly 510 at the first coupling element 558A and the second coupling element 558B, and guides the received input image light to the decoupling element 568A. The first coupling element 558A and the second coupling element 558B couple the image light from the source assembly 510 into the output waveguide 528. The role of the first coupling element 558A and the second coupling element 558B is to split the image light from the source assembly 510 horizontally in advance (before the in-coupled image light reaches the decoupling element 568A or 568B). The configuration shown in the example of FIG. 5M, among several other merits, helps to reduce the lateral surface area of the output waveguide 528, and achieve a substantially lower form factor for the output waveguide 528.

The coupling element 558A and the coupling element 558B may be, e.g., a diffraction grating, a holographic grating, or some combination thereof. The coupling element 558A and the coupling element 558B has a first grating vector. The pitch of the coupling element 558A and the coupling element 558B may be 300-600 nm.

Figure 5N:
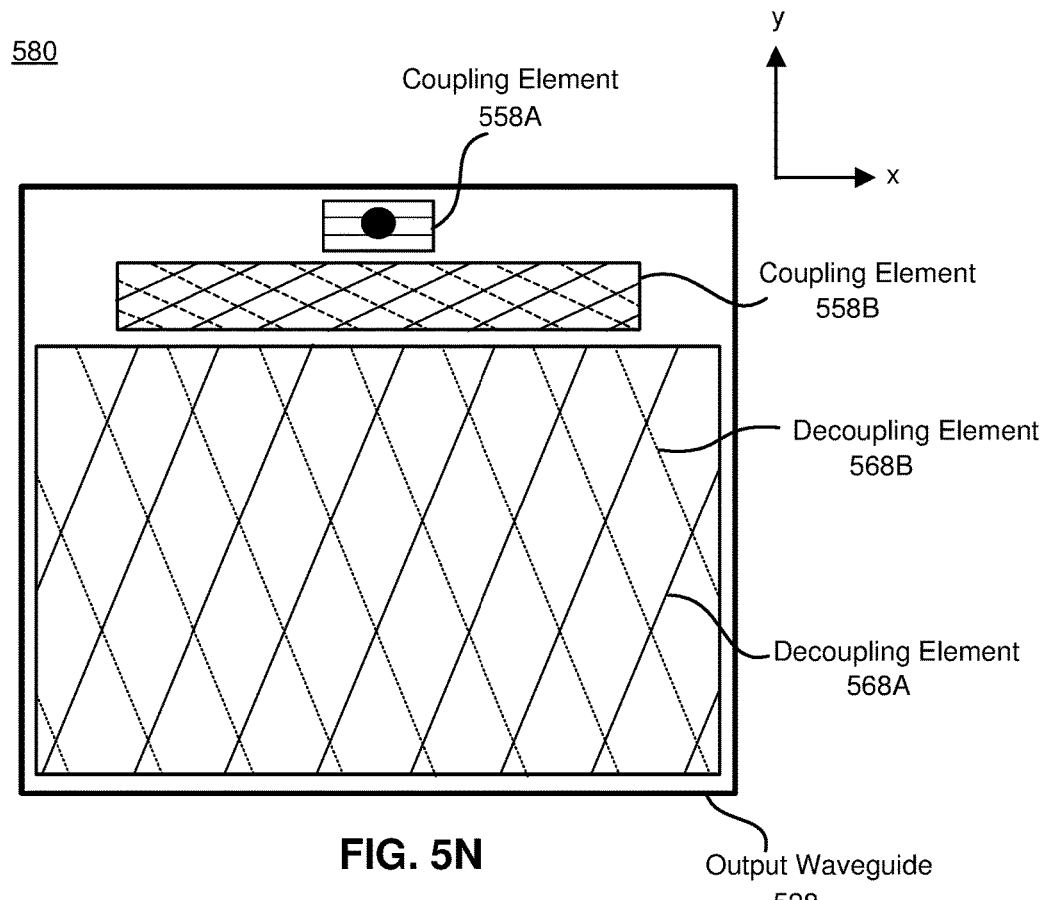
FIG. 5N illustrates a top view of the fifth design of the waveguide display shown in FIG. 4, in accordance with an embodiment.

FIG. 5N illustrates a top view 580 of the fifth design of the waveguide display shown in FIG. 4, in accordance with an embodiment. The top view 580 includes the first coupling element 558A, the second coupling element 558B, the decoupling element 568A, and the decoupling element 568B of the output waveguide 528. The example path 585 is a path of a wave vector of the image light that is affected by the grating vectors of the first coupling element 558A, the second coupling element 558B, the first decoupling element 568A, and the second decoupling element 568B that the image light meets. The grating vectors are just added to change the path of the wave vector. In the example path 585, image light from the source assembly (not shown here) is associated with a projected radial wave vector (not shown). The image light is coupled into the output waveguide 528 via the first coupling element 558A and the second coupling element 558B associated with an input grating vector (not shown). The in-coupled light is then diffracted by the first decoupling element 568A associated with a first grating vector (not shown). The light is then diffracted (and out coupled from the output waveguide 528) by the second decoupling element 568B associated with a second grating vector (not shown). In one embodiment, the example path 585 includes a summation point 565P. The summation of the input grating vector, the first grating vector, and the second grating vector at the summation point 565P is zero. In a second embodiment, the example path 585 includes a summation point 565Q. The summation point 565Q corresponds to the sum of the k-vectors in the order corresponding to: a grating vector associated with the first coupling element 558A, the second coupling element 558B, a grating vector associated with the decoupling element 568B, and the grating vector associated with the decoupling element 568A. The summation of the input grating vector, the first grating vector, and the second grating vector at the summation point 565Q is zero.

Figure 5O:
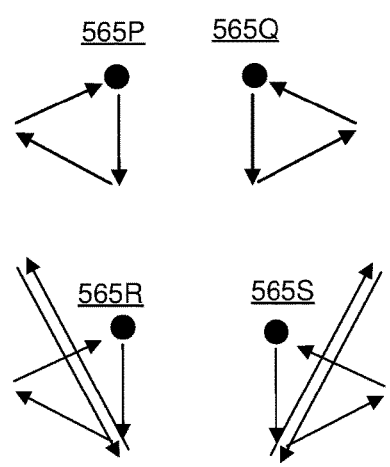
FIG. 5O illustrates an example path of grating vectors associated with a plurality of diffraction gratings of the fifth design of the waveguide display shown in FIG. 4, in accordance with an embodiment.

FIG. 5O illustrates an example path 585 of grating vectors associated with a plurality of diffraction gratings of the fifth design of the waveguide display shown in FIG. 4, in accordance with an embodiment. The example path 585 is a path of a wave vector of the image light that is affected by the grating vectors of the coupling element 558A, the first decoupling element 566A, and the second decoupling element 566B that the image light meets. The grating vectors are just added to change the path of the wave vector. In the example path 570, image light from the source assembly (not shown here) is associated with a projected radial wave vector (not shown). The image light is coupled into the output waveguide 526 via the coupling element 556 associated with an input grating vector (not shown). The in-coupled light is then diffracted by the first decoupling element 566A associated with a first grating vector (not shown). The light is then diffracted (and out coupled from the output waveguide 526) by the second decoupling element 566B associated with a second grating vector (not shown). In one embodiment, the example path 570 includes a summation point 565J. The summation of the input grating vector, the first grating vector, and the second grating vector at the summation point 565J is zero. In a second embodiment, the example path 570 includes a summation point 565K. The summation point 565K corresponds to the sum of the k-vectors in the order corresponding to: a grating vector associated with the coupling element 556, a grating vector associated with the decoupling element 566B, and the grating vector associated with the decoupling element 566A. The summation of the input grating vector, the first grating vector, and the second grating vector at the summation point 565K is zero.

Figure 6A:
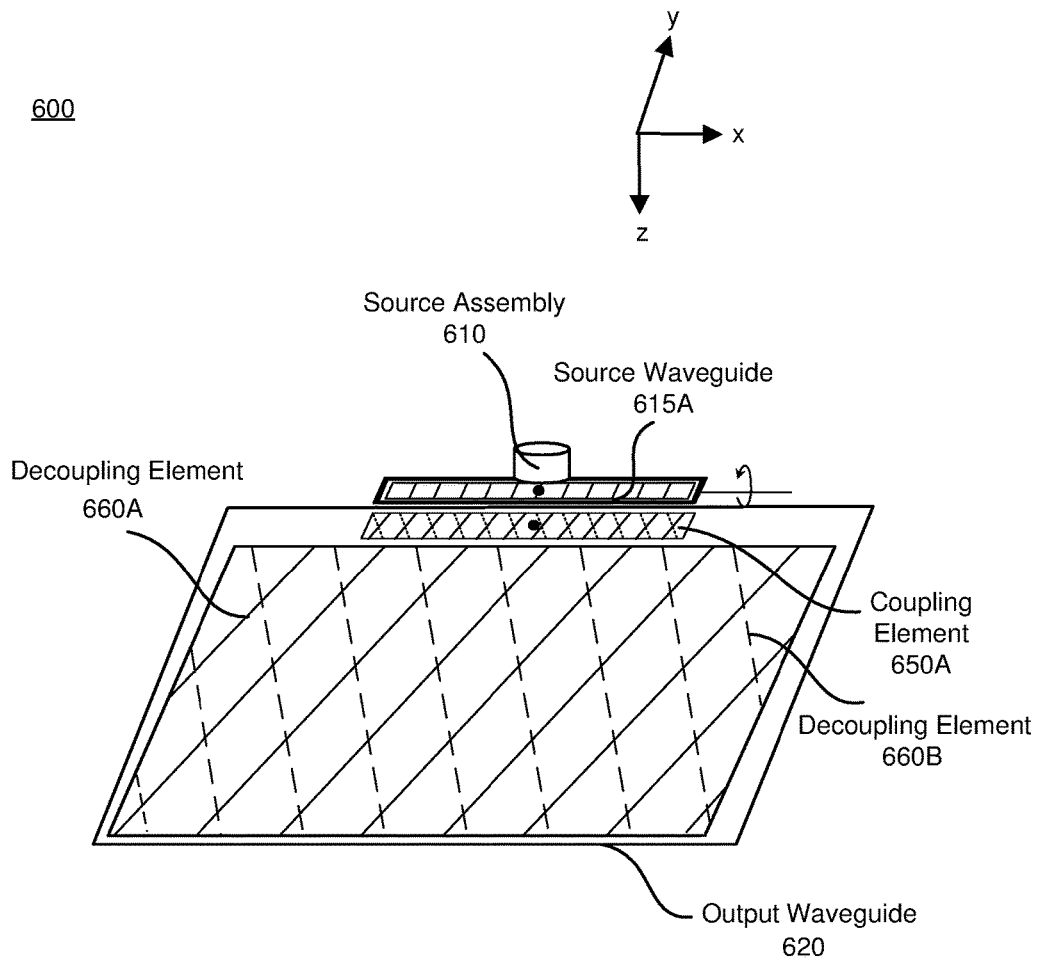
FIG. 6A illustrates an isometric view of a sixth design of the waveguide display shown in FIG. 4, in accordance with an embodiment.

FIG. 6A illustrates an isometric view of a sixth design of the waveguide display 600 shown in FIG. 4, in accordance with an embodiment. The waveguide display 600 includes the source assembly 610, a source waveguide 615A, and an output waveguide 620.

The source waveguide 615A is an optical waveguide. The source waveguide 615A receives the image light from the source assembly 610 and outputs an image light (not shown) to an output waveguide 620. The image light from the source waveguide 615A propagates along a dimension with an input wave vector as described below with reference to FIG. 6C.

The output waveguide 620 is an optical waveguide. The output waveguide 620 includes a coupling element 650A, a decoupling element 660A and a decoupling element 660B.

Figure 6B:
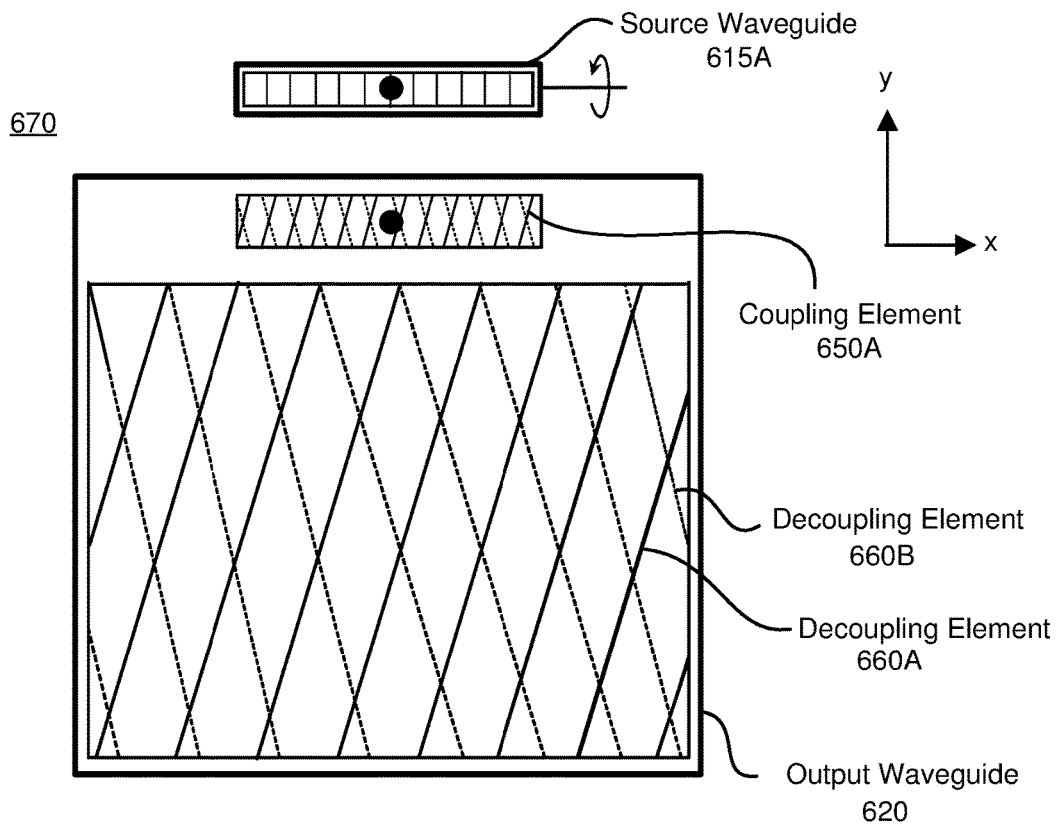
FIG. 6B illustrates a top view of the sixth design of the waveguide display shown in FIG. 4, in accordance with an embodiment.

FIG. 6B illustrates a top view 670 of the sixth design of the waveguide display shown in FIG. 4, in accordance with an embodiment. The top view 670 includes the source assembly 610, the source waveguide 615A, and the output waveguide 620.

Figure 6C:
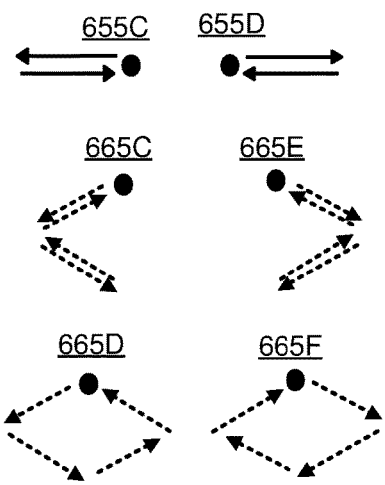
FIG. 6C illustrates an example path of grating vectors associated with a plurality of diffraction gratings of the sixth design of the waveguide display shown in FIG. 4, in accordance with an embodiment.

FIG. 6C illustrates an example path 680 of grating vectors associated with a plurality of diffraction gratings of the sixth design of the waveguide display shown in FIG. 4, in accordance with an embodiment. The example path 680 is a path of a wave vector of the image light that is affected by the grating vectors of the coupling element 650A, the first decoupling element 660A, and the second decoupling element 660B that the image light meets. The grating vectors are just added to change the path of the wave vector. In the example path 680, image light from the source assembly 610 is associated with a projected radial wave vector (not shown). The image light is coupled into the output waveguide 620 via the coupling element 650A associated with an input grating vector (not shown). The in-coupled light is then diffracted by the first decoupling element 660A associated with a first grating vector (not shown). The light is then diffracted (and out coupled from the output waveguide) by the second decoupling element 660B associated with a second grating vector (not shown). In one embodiment, the example path 680 includes a first summation point 655C, a second summation point 665C, and a third summation point 665D. Note that the summation of the projected radial wave vector at the first summation point 655C is zero.

In a different embodiment, the example path 680 includes a summation point 655D, a summation point 665E, and a summation point 665F. The summation point 655D is an embodiment of the first summation point 655C. The summation point 665E is an embodiment of the second summation point 665C. The summation point 665F is an embodiment of the third summation point 655D. Note that the summation point 655C and the summation point 655D occur in the source waveguide 615A, while the summation point 665C, the summation point 665D, the summation point 665E, and the summation point 665F occur in the output waveguide 620.

The coupling element 650A, the first decoupling element 660A, and the second decoupling element 660B, are diffraction gratings whose grating vectors sum to a value that is less than a threshold value, and the threshold value is close to or equal to zero. In this example, a zero summation occurs, as the vector path returns to its origination point. With the occurrence of the zero summation, the image light exits the output waveguide 620 with the same angle as the incident angle from the source assembly 610 since the remaining radial wave vector is associated with the FOV of the waveguide display.

Figure 7:
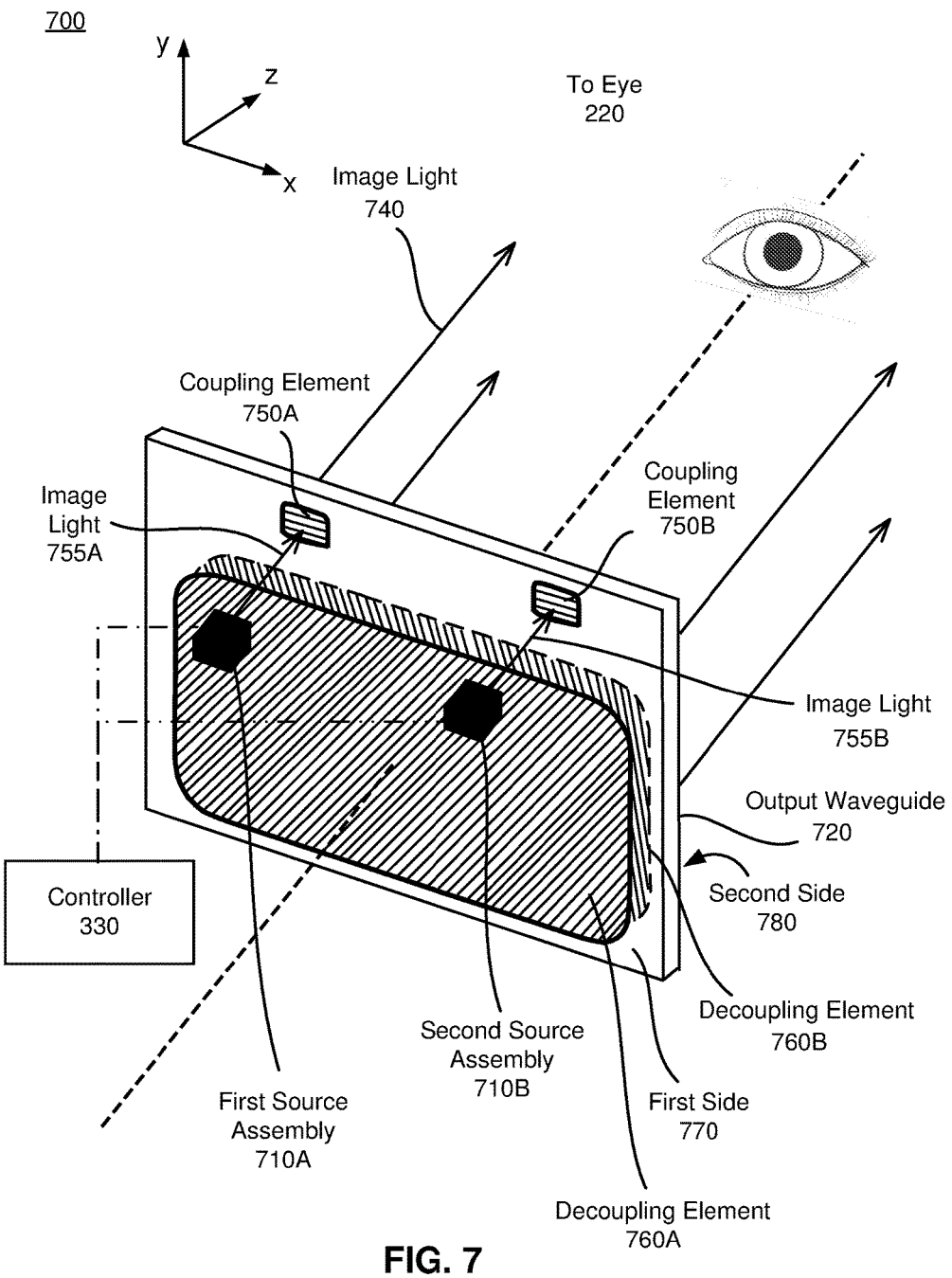
FIG. 7 illustrates an isometric view of a waveguide display with two source assemblies, in accordance with an embodiment.

FIG. 7 illustrates an isometric view of a waveguide display 700 with two source assemblies, in accordance with an embodiment. The waveguide display 700 includes a first source assembly 710A, a second source assembly 710B, an output waveguide 720 and the controller 330.

The first source assembly 710A generates and outputs an image light 755A to the first coupling element 750A. The second source assembly 710B generates and outputs an image light 755B to the second coupling element 750B. Each of the image light 755A and the image light 755B is an embodiment of the image light 355 of FIG. 3. The controller 330 sends display instructions to each of the first source assembly 710A and the second source assembly 710B.

In some embodiments, the first source assembly 710A and the second source assembly 710B are located with a threshold value of distance of separation along the X-dimension. In alternate embodiments, the first source assembly 710A and the second source assembly 710B are located with a threshold value of distance of separation along the Y-dimension. Example positions of the first source assembly 710A and 710B are also discussed below with regard to FIGS. 9A, 10A, and 11A.

The output waveguide 720 is an optical waveguide that outputs image light to an eye 220 of a user. The output waveguide 720 receives the image light 755A at the coupling element 750A and the image light 755B at the coupling element 750B, and guides the received input image light to the decoupling element 760A. In some embodiments, the coupling element 750A couples the image light 755A from the first source assembly 710A into the output waveguide 720. The coupling element 750A may be, e.g., a diffraction grating, a holographic grating, one or more cascaded reflectors, one or more prismatic surface elements, an array of holographic reflectors, or some combination thereof. The coupling element 750A has a first grating vector. The pitch of the coupling element 750A may be 300-600 nm. The coupling element 750A may be 2 mm wide and 2 mm thick.

The coupling element 750A at the first side 770 couples the image light 755A from the first source assembly 710A into the output waveguide 720. In embodiments where the coupling element 750A is diffraction grating, the pitch of the diffraction grating is chosen such that total internal reflection occurs, and the image light 755A propagates internally toward the decoupling element 760A. For example, the pitch of the coupling element 750A may be in the range of 300 nm to 600 nm. In alternate embodiments, the coupling element 750A is located at the second side 780 of the output waveguide 720. The coupling element 750B is an embodiment of the coupling element 750A. The image light 755B is an embodiment of the image light 755A.

The decoupling element 760A redirects the image light 755A toward the decoupling element 760B for decoupling from the output waveguide 720. In embodiments where the decoupling element 760A is a diffraction grating, the pitch of the diffraction grating is chosen to cause incident image light 755A to exit the output waveguide 720 at a specific angle of inclination to the surface of the output waveguide 720. An orientation of the image light exiting from the output waveguide 720 may be altered by varying the orientation of the image light exiting the first source assembly 710A, varying an orientation of the first source assembly 710A, or some combination thereof. For example, the pitch of the diffraction grating may be in the range of 300 nm to 600 nm, and the size of the diffraction grating may be 30 mm by 25 mm. Both the coupling element 750 and the decoupling element 760A are designed such that a sum of their respective grating vectors is less than a threshold value, and the threshold value is close to or equal to zero. In some configurations, the coupling elements 750A and 750B couple the image light into the output waveguide 720 and the image light propagates along one dimension. The decoupling element 760A receives image light from the coupling elements 750A and 750B covering a first portion of the first angular range emitted by the source assemblies 710A and 710B and diffracts the received image light to another dimension. Note that the received image light is expanded in 2D until this stage. The decoupling element 760B diffracts a 2-D expanded image light toward the eyebox. In alternate configurations, the coupling elements 750A and 750B couple the image light into the output waveguide 720 and the image light propagates along one dimension. The decoupling element 760B receives image light from the coupling elements 750A and 750B covering a first portion of the first angular range emitted by the first source assembly 710A and the second source assembly 710B, and diffracts the received image light to another dimension. Note that the received image light is expanded in 2D until this state. The decoupling element 760A diffracts a 2-D expanded image light toward the eyebox.

The image light 740 exiting the output waveguide 720 is expanded at least along two dimensions (e.g., may be elongated along X-dimension). The image light 740 couples to the human eye 220. The image light 740 exits the output waveguide 720 such that a sum of the respective grating vectors of each of the coupling element 750, the decoupling element 760A, and the decoupling element 760B is less than a threshold value, and the threshold value is close to or equal to zero. An exact threshold value is going to be system specific, however, it should be small enough to not degrade image resolution beyond acceptable standards (if non-zero dispersion occurs and resolution starts to drop). In some configurations, the image light 740 propagates along wave vectors along at least one of X-dimension, Y-dimension, and Z-dimension.

In alternate embodiments, the image light 740 exits the output waveguide 720 via the decoupling element 760A. Note the decoupling elements 760A and 760B are larger than the coupling element 750A, as the image light 740 is provided to an eyebox located at an exit pupil of the waveguide display 700.

In another embodiment, the waveguide display 700 includes two or more decoupling elements. For example, the decoupling element 760A may include multiple decoupling elements located side by side with an offset. In another example, the decoupling element 760A may include multiple decoupling elements stacked together to create a two-dimensional decoupling element.

The controller 330 controls the first source assembly 710A and the second source assembly 710B by providing display instructions to each of the first source assembly 710A and the second source assembly 710B. The display instructions cause the first source assembly 710A and the second source assembly 710B to render light such that image light exiting the decoupling element 760A of the output waveguide 720 scans out one or more 2D images. For example, the display instructions may cause the first source assembly 710A and the second source assembly 710B (via adjustments to optical elements in the optics system 820) to scan out an image in accordance with a scan pattern (e.g., raster, interlaced, etc.).

Figure 8:
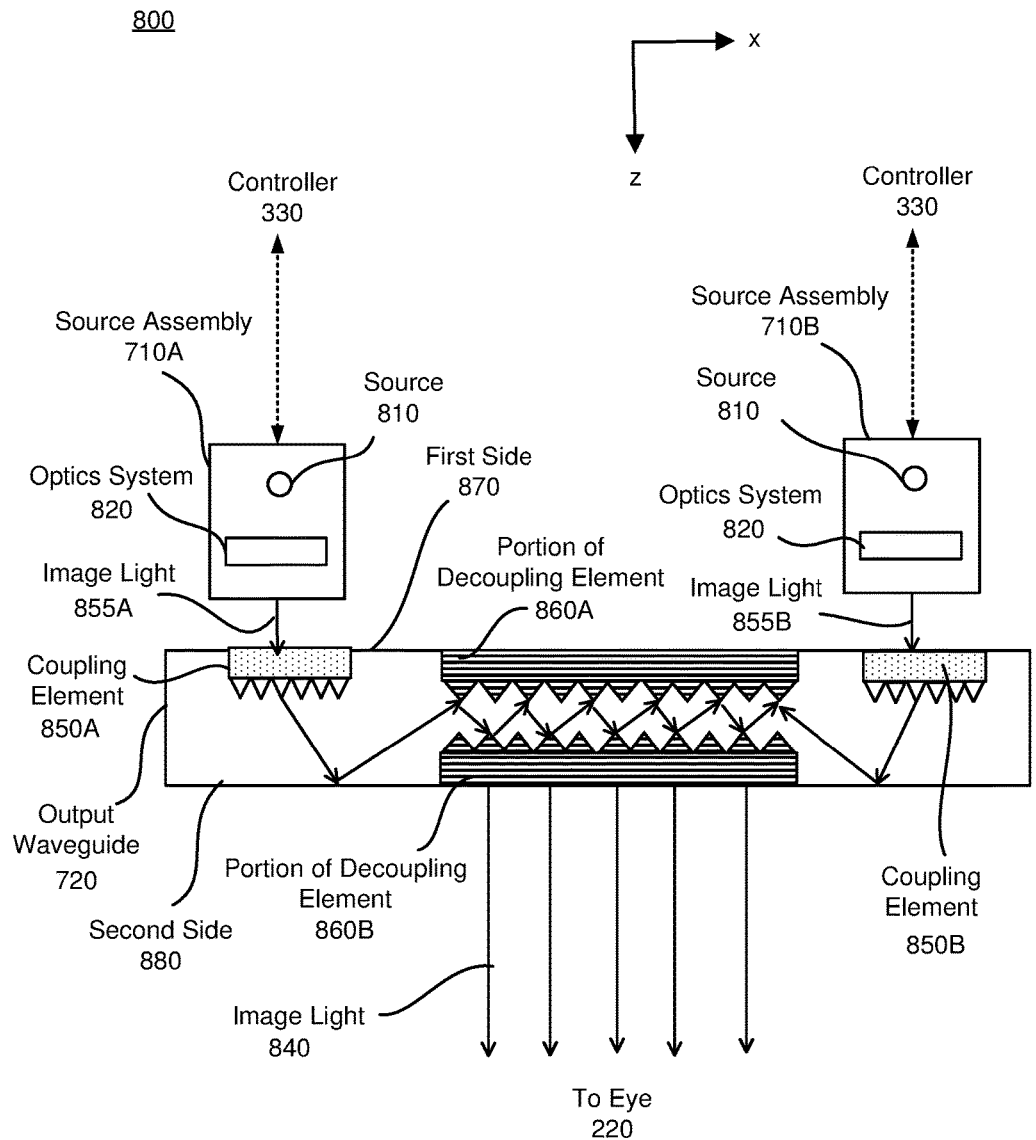
FIG. 8 illustrates a cross-section of waveguide display including two source assemblies, a portion of two decoupling elements, and two coupling elements, in accordance with an embodiment.

FIG. 8 illustrates a cross section 800 of the waveguide display including two source assemblies, a portion of two decoupling elements, and two coupling elements, in accordance with an embodiment. The cross section 800 includes the first source assembly 710A, the second source assembly 710B, and a portion of the output waveguide 720 of FIG. 7.

Each of the first source assembly 710A and the second source assembly 710B generates light in accordance with display instructions from the controller 330. The first source assembly 710A includes the source 810, and the optics system 820, as described above in conjunction with FIG. 4. The second source assembly 810B is an embodiment of the first source assembly 810A.

The output waveguide 720 is an optical waveguide that outputs an image light 840 to an eye 220 of a user. The output waveguide 720 receives the image light 855A at the coupling element 850A and the image light 855B at the coupling element 850B located on a first side 870, and guides the received input image light to a portion of a decoupling element 860A. In some embodiments, the coupling element 850A couples the image light 855A from the first source assembly 810A into the output waveguide 720. The coupling element 850A may be, e.g., a diffraction grating, a holographic grating, or some combination thereof. The coupling element 850A has a first grating vector. The pitch of the coupling element 850A may be 300-600 nm.

The portion of the decoupling element 860A redirects the total internally reflected image light from the output waveguide 720 such that it may be decoupled via a portion of the decoupling element 860B. The portion of the decoupling element 860A is part of, or affixed to, the first side 870 of the output waveguide 720. The decoupling element 860B is part of, or affixed to, a second side 880 of the output waveguide 720, such that the portion of the decoupling element 860A is opposed to the decoupling element 860B. Opposed elements are opposite to each other on a waveguide.

The coupling element 850A, the coupling element 850B, the portion of the decoupling element 860A, and the portion of the decoupling element 860B are designed such that a sum of their respective grating vectors is less than a threshold value, and the threshold value is close to or equal to zero. Accordingly, the image light 855A and the image light 855B entering the output waveguide 720 is propagating in the same direction when it is output as image light 840 from a portion of the decoupling element 860B of the output waveguide 720. Moreover, in alternate embodiments, additional coupling elements and/or de-coupling elements may be added. And so long as the sum of their respective grating vectors is less than the threshold value, the image light 855A, the image light 855B and the image light 840 propagate in the same direction. In some embodiments, the waveguide display includes a plurality of the first source assemblies 710A, a plurality of the second source assemblies 710B and/or a plurality of the coupling elements 850A and the coupling elements 850B to increase the FOV further.

The controller 330 controls the first source assembly 710A and the second source assembly 710B by providing display instructions to each of the first source assembly 710A and the second source assembly 710B. The display instructions cause the first source assembly 710A and the second source assembly 710B to render light such that image light exiting the decoupling element 860B of the output waveguide 720 scans out one or more 2D images. The display instructions control an intensity of light emitted from the source 810, and the optics system 820 scans out the image by rapidly adjusting orientation of the emitted light.

If done fast enough, a human eye integrates the scanned pattern into a single 2D image.

Figure 9A:
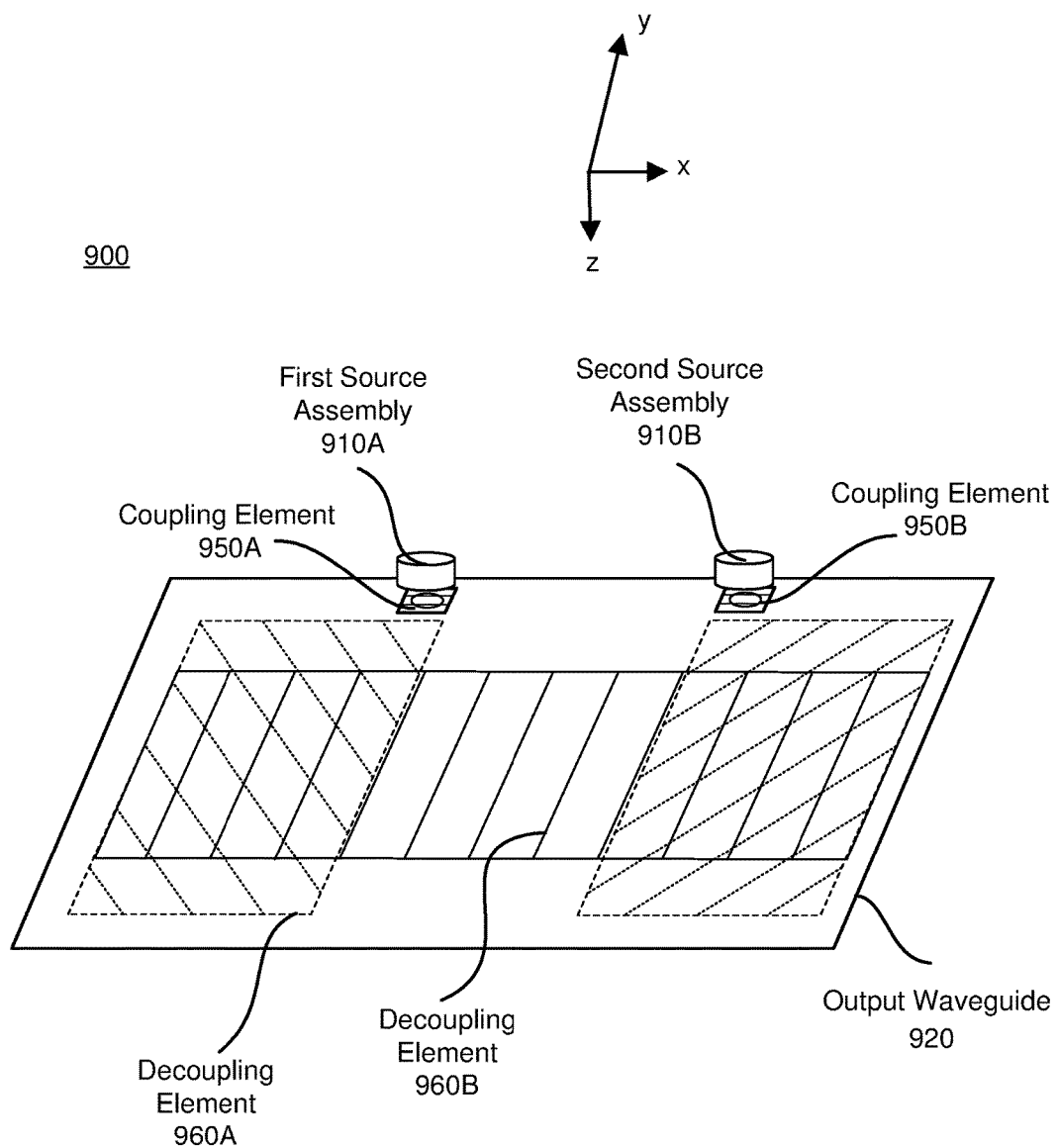
FIG. 9A illustrates an isometric view of a seventh design of the waveguide display shown in FIG. 7, in accordance with an embodiment.

FIG. 9A illustrates an isometric view 900 of a seventh design of the waveguide display shown in FIG. 7, in accordance with an embodiment. The isometric view 900 includes the first source assembly 910A, the second source assembly 910B and an output waveguide 920.

Each of the first source assembly 910A and the second source assembly 910B is a set of optical components that perform a generation and conditioning of an image light. The first source assembly 910A outputs an image light (not shown) to the output waveguide 920. The second source assembly 910B outputs an image light (not shown) to the output waveguide 920.

The output waveguide 920 is an optical waveguide that outputs image light to an eye 220 of a user. The output waveguide 920 receives an image light (not shown) at the coupling element 950A and the coupling element 950B, and guides the received input image light to the decoupling element 960A. In some embodiments, the coupling element 950A and the coupling element 950B couple the image light from the first source assembly 910A and the second source assembly 910B into the output waveguide 920. The coupling element 950A may be, e.g., a diffraction grating, a holographic grating, or some combination thereof. The coupling element 950A has a first grating vector. The pitch of the coupling element 950A may be 300-600 nm. As shown in FIG. 9A, the output waveguide 920 includes the first source assembly 910A that projects light into the coupling element 950A, and the second source assembly 910B that projects light into the coupling element 950B, and the coupling element 950A and the coupling element 950B are on the same surface of the output waveguide 920, and both the coupling element 950A and the coupling element 950B are located adjacent to a same side along the X-dimension of the decoupling element 960A. In one configuration, the seventh design of the waveguide display provides a horizontal field of view of 65.0 degrees, a vertical field of view of 30.5 degrees, and a diagonal field of view of 71.8 degrees. In another configuration, the coupling element 950A and the coupling element 950B include a pitch in the range of 300 nm to 600 nm, and the decoupling elements 960A and 960B include a pitch in the range of 300 nm to 600 nm. In yet another configuration, the first source assembly 910A and the second source assembly 910B include a distance of separation of at least 20 mm.

Figure 9B:
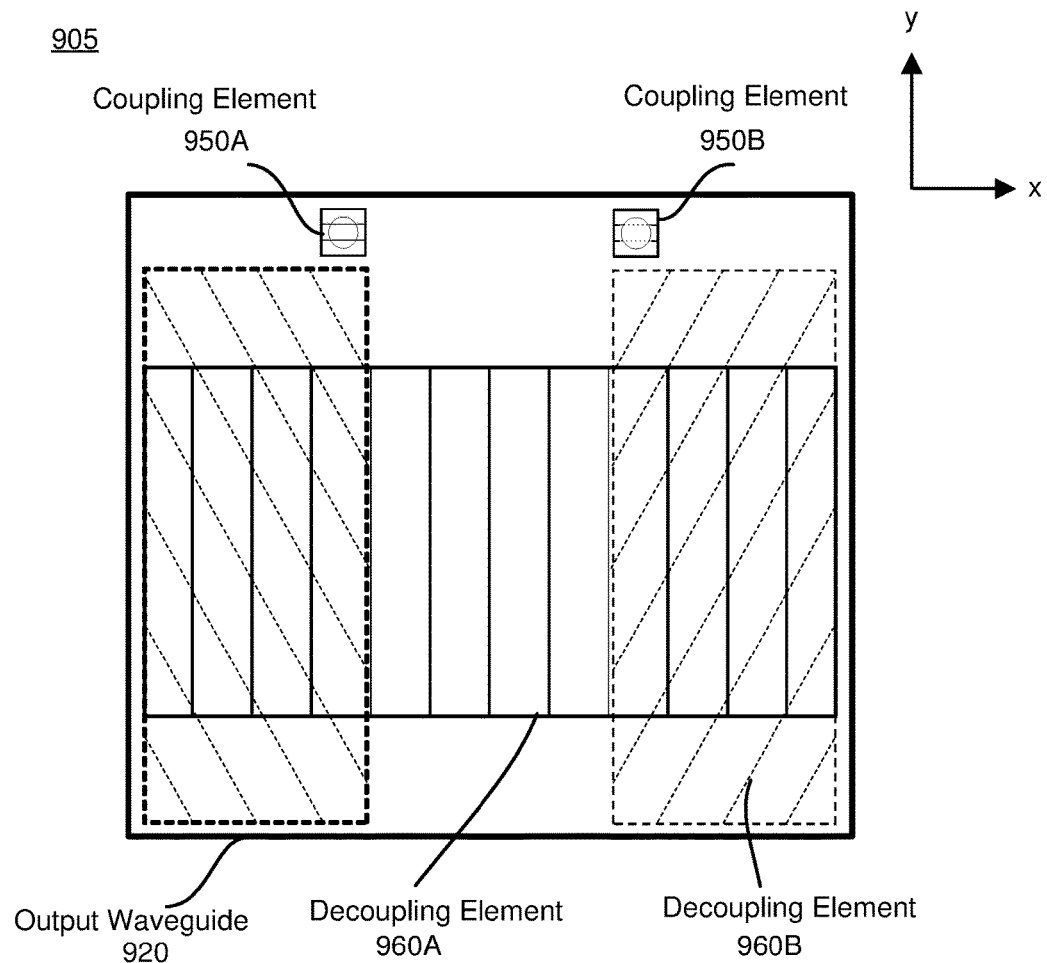
FIG. 9B illustrates a top view of the seventh design of the waveguide display shown in FIG. 7, in accordance with an embodiment.

FIG. 9B illustrates a top view 905 of the seventh design of the waveguide display shown in FIG. 7, in accordance with an embodiment. The top view 905 includes the coupling element 950A, the coupling element 950B, the decoupling element 960A, and the decoupling element 960B of the output waveguide 920.

Figure 9C:
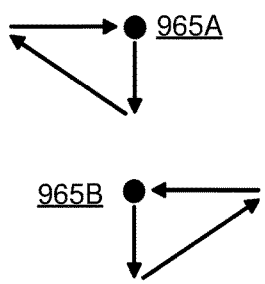
FIG. 9C illustrates an example path of grating vectors associated with a plurality of diffraction gratings of the seventh design of the waveguide display shown in FIG. 7, in accordance with an embodiment.

FIG. 9C illustrates an example path 915 of grating vectors associated with a plurality of diffraction gratings of the seventh design of the waveguide display shown in FIG. 7, in accordance with an embodiment. The example path 915 is a path of a wave vector of the image light that is affected by the grating vectors of the coupling element 950A, the coupling element 950B, the first decoupling element 960A, and the second decoupling element 960B that the image light meets. The grating vectors are just added to change the path of the wave vector. In the example path 915, image light from each of the source assemblies (not shown here) is associated with a respective projected radial wave vector (not shown). The image light is coupled into the output waveguide 920 via the coupling element 950A and the coupling element 950B associated with a respective input grating vector (not shown). The in-coupled light is then diffracted by the first decoupling element 960A associated with a first grating vector (not shown). The light is then diffracted (and out coupled from the output waveguide 920) by the second decoupling element 960B associated with a second grating vector (not shown). In one embodiment, the example path 915 includes a summation point 965A. The summation of the input grating vector, the first grating vector, and the second grating vector at the summation point 965A is zero. In a second embodiment, the example path 915 includes a summation point 965B. The summation of the input grating vector, the first grating vector, and the second grating vector at the summation point 965B is zero. In some configurations, the example path 915 includes at least two of the input wave vector, the first grating vector, and the second grating vector intersecting at 90 degrees resulting in a right-angled triangle.

Figure 10A:
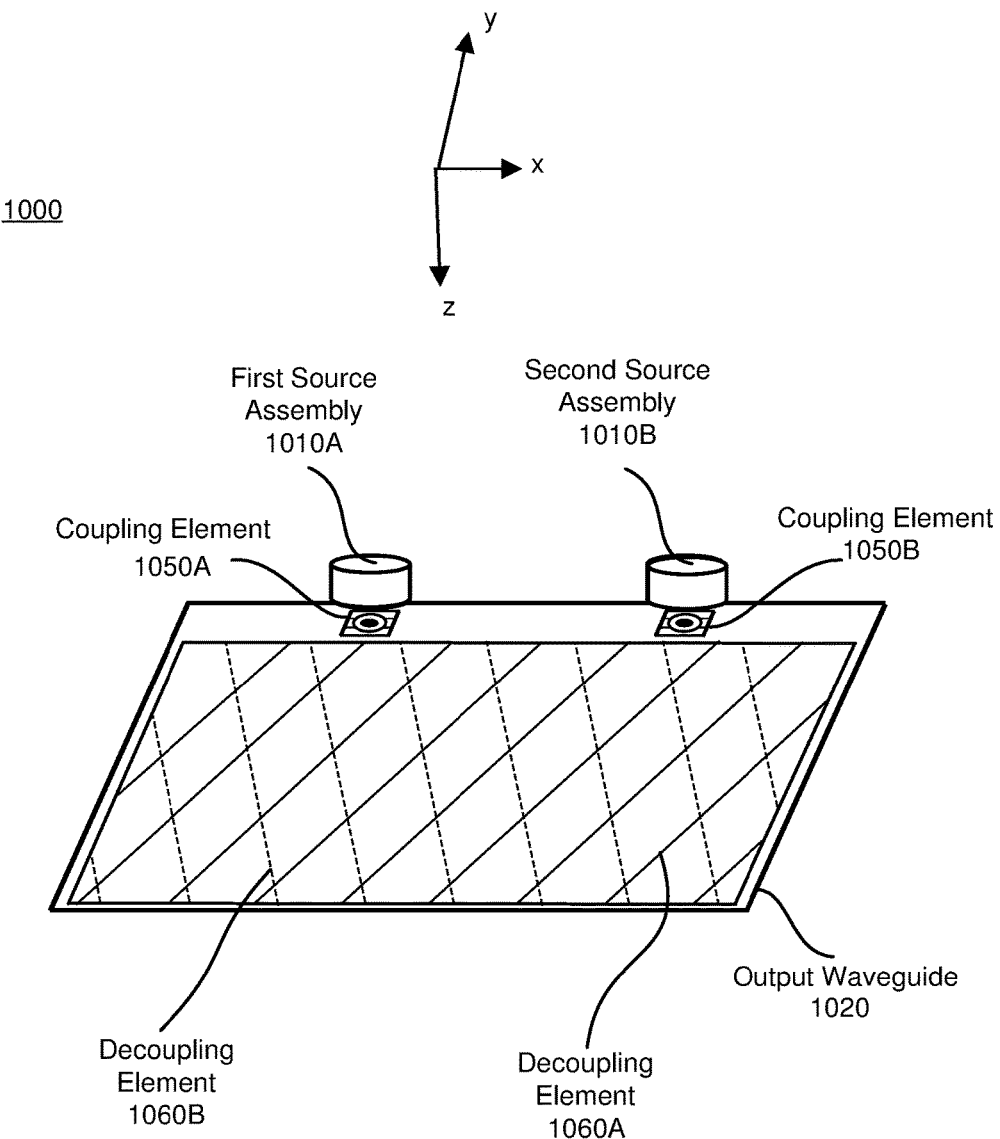
FIG. 10A illustrates an isometric view of an eighth design of the waveguide display shown in FIG. 7, in accordance with an embodiment.

FIG. 10A illustrates an isometric view 1000 of an eighth design of the waveguide display shown in FIG. 7, in accordance with an embodiment. The isometric view 1000 includes the first source assembly 1010A, the second source assembly 1010B and the output waveguide 1020.

Each of the first source assembly 1010A and the second source assembly 010B is a set of optical components that perform a generation and conditioning of an image light. The first source assembly 1010A outputs an image light (not shown) to the output waveguide 1020. The second source assembly 1010B outputs an image light (not shown) to the output waveguide 1020.

The output waveguide 1020 is an optical waveguide that outputs image light to an eye 220 of a user. The output waveguide 1020 receives an image light (not shown) at the coupling element 1050A and the coupling element 1050B, and guides the received input image light to the decoupling element 1060A. In some embodiments, the coupling element 1050A and the coupling element 1050B couple the image light from the first source assembly 1010A and the second source assembly 1010B into the output waveguide 1020. The coupling element 1050A may be, e.g., a diffraction grating, a holographic grating, or some combination thereof. The coupling element 1050A has a first grating vector. The pitch of the coupling element 950A may be 300-600 nm.

In one configuration, the eighth design of the waveguide display provides a horizontal field of view of 54.0 degrees, a vertical field of view of 27.0 degrees, and a diagonal field of view of 60.4 degrees. In another configuration, the coupling element 1050A and the coupling element 1050B include a pitch in the range of 300 nm to 600 nm, and the decoupling elements 1060A and 1060B include a pitch in the range of 300 nm to 600 nm. In yet another configuration, the first source assembly 1010A and the second source assembly 1010B include a distance of separation of 20 mm.

Figure 10B:
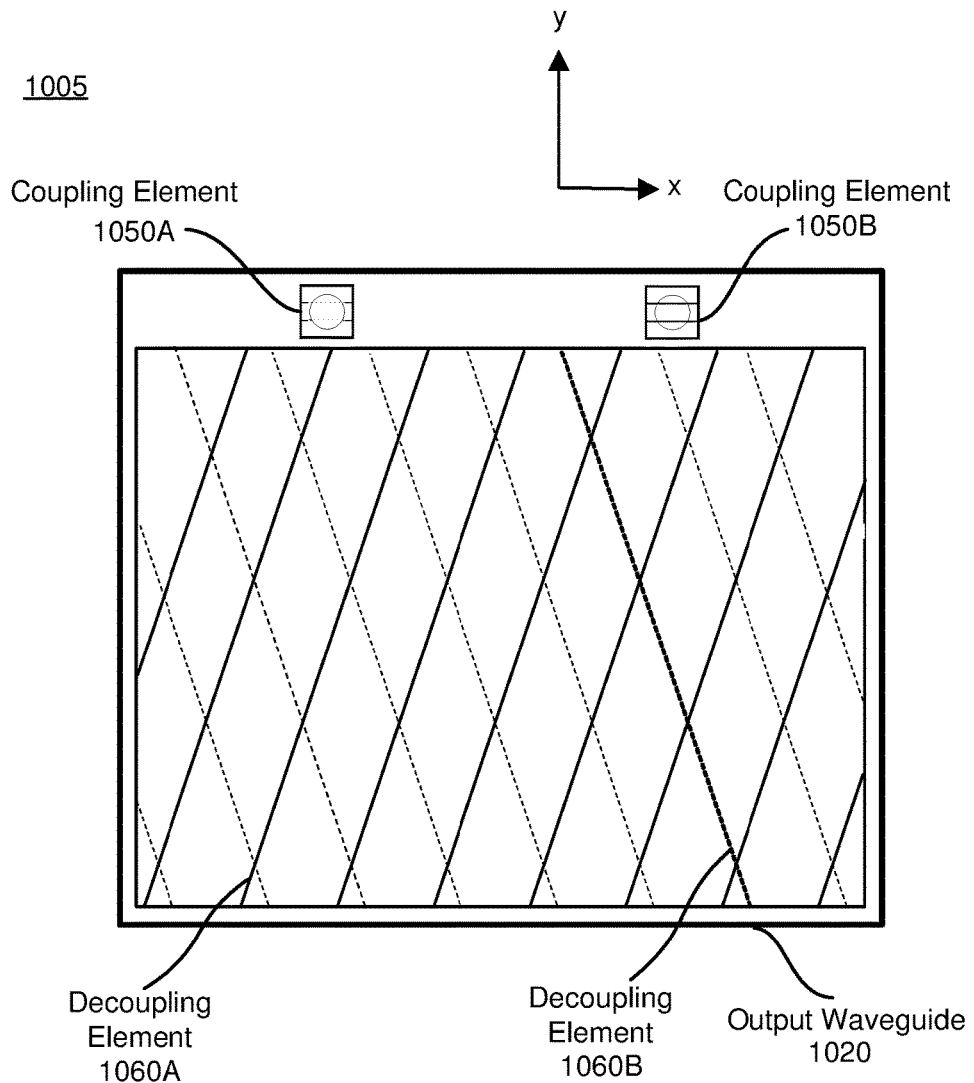
FIG. 10B illustrates a top view of the eighth design of the waveguide display shown in FIG. 7, in accordance with an embodiment.

FIG. 10B illustrates a top view 1005 of the eighth design of the waveguide display shown in FIG. 7, in accordance with an embodiment. The top view 1005 includes the coupling element 1050A, the coupling element 1050B, the decoupling element 1060A, and the decoupling element 1060B of the output waveguide 1020.

Figure 10C:
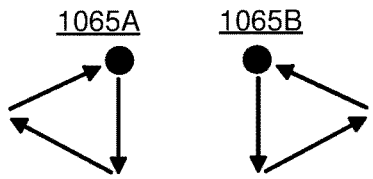
FIG. 10C illustrates an example path of grating vectors associated with a plurality of diffraction gratings of the eighth design of the waveguide display shown in FIG. 7, in accordance with an embodiment.

FIG. 10C illustrates an example path 1015 of grating vectors associated with a plurality of diffraction gratings of the eighth design of the waveguide display shown in FIG. 7, in accordance with an embodiment. The example path 1015 is a path of a wave vector of the image light that is affected by the grating vectors of the coupling element 1050A, the coupling element 1050B, the first decoupling element 1060A, and the second decoupling element 1060B that the image light meets. The grating vectors are just added to change the path of the wave vector. In the example path 1015, image light from each of the source assemblies (not shown here) is associated with a respective projected radial wave vector (not shown). The image light is coupled into the output waveguide 1020 via the coupling element 1050A and the coupling element 1050B associated with a respective input grating vector (not shown). The in-coupled light is then diffracted by the first decoupling element 1060A associated with a first grating vector (not shown). The light is then diffracted (and out coupled from the output waveguide 1020) by the second decoupling element 1060B associated with a second grating vector (not shown). In one embodiment, the example path 1015 includes a summation point 1065A. The summation of the input grating vector, the first grating vector, and the second grating vector at the summation point 1065A is zero. In a second embodiment, the example path 1015 includes a summation point 1065B. The summation of the input grating vector, the first grating vector, and the second grating vector at the summation point 1065B is zero. In some configurations, the example path 1015 is an equilateral triangle with the same magnitude for the input wave vector, the first grating vector, and the second grating vector.

Figure 11A:
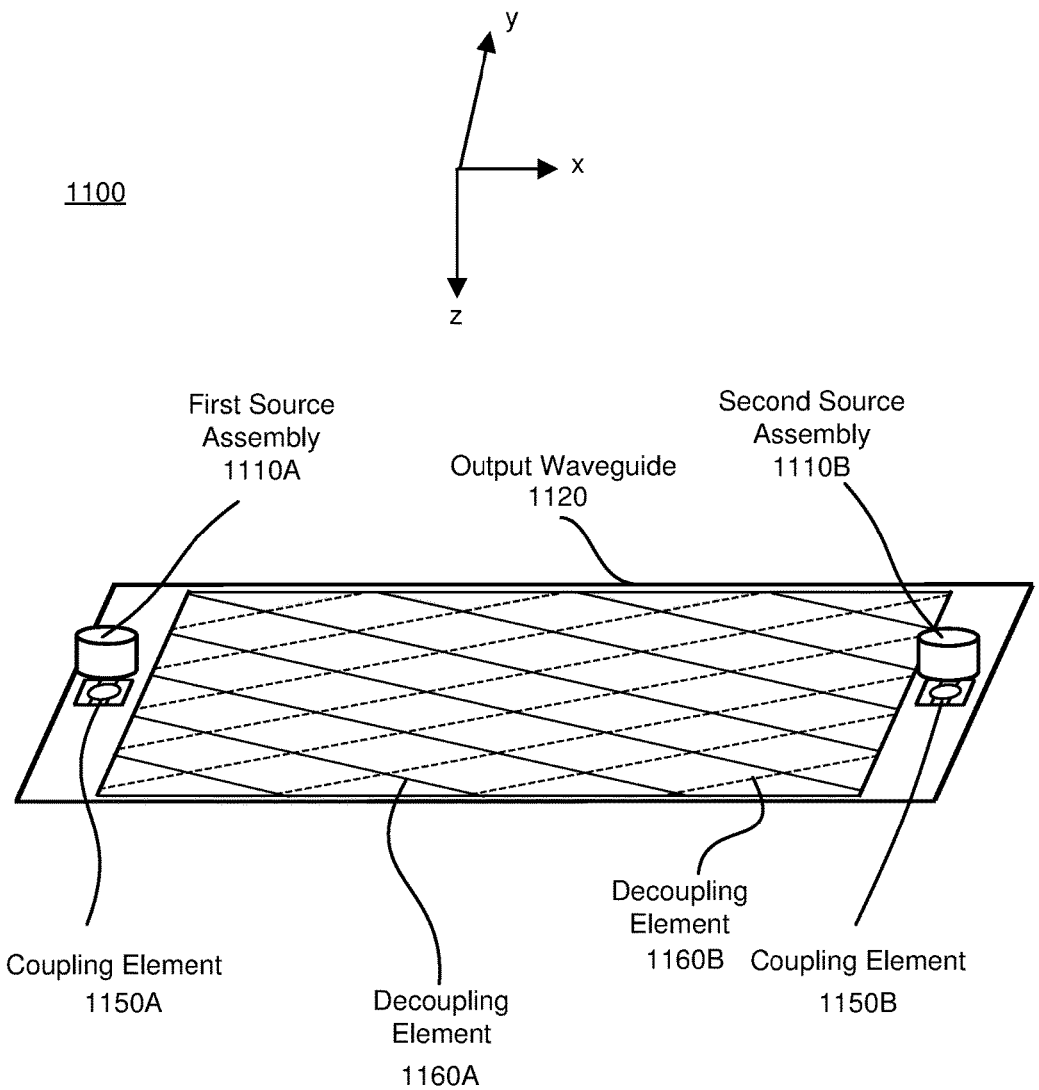
FIG. 11A illustrates an isometric view of a ninth design of the waveguide display shown in FIG. 7, in accordance with an embodiment.

FIG. 11A illustrates an isometric view 1100 of a ninth design of the waveguide display shown in FIG. 7, in accordance with an embodiment. The isometric view 1100 includes the first source assembly 1110A, the second source assembly 1110B, and an output waveguide 1120.

Each of the first source assembly 1110A and the second source assembly 1110B is a set of optical components that perform a generation and conditioning of an image light. The first source assembly 1110A outputs an image light (not shown) to the output waveguide 1120. The second source assembly 1110B outputs an image light (not shown) to the output waveguide 1120. The first source assembly 1110A and the second source assembly 1110B are located with a threshold value of distance of separation along the X-dimension, and at a central position along the Y-dimension (e.g. mid-point of a side of the output waveguide 1120 along the Y-axis).

The output waveguide 1120 is an optical waveguide that outputs image light to an eye 220 of a user. The output waveguide 1120 receives an image light (not shown) at the coupling element 1150A and the coupling element 1150B, and guides the received input image light to the decoupling element 1160A. In some embodiments, the coupling element 1150A and the coupling element 1150B couple the image light from the first source assembly 1110A and the second source assembly 1110B, respectively, into the output waveguide 1120. The coupling element 1150A may be, e.g., a diffraction grating, a holographic grating, or some combination thereof. The coupling element 1150A has a first grating vector. The pitch of the coupling element 1150A may be 300-600 nm. As shown in FIG. 11A, the first source assembly 1110A projects light into the coupling element 1150A, and the second source assembly 1110B projects light into the coupling element 1150B, and the coupling element 1150A and the coupling element 1150B are on the same surface along the X-Y plane, and the decoupling element 1160A is in between the coupling element 1150A and the coupling element 1150B.

In one configuration, the ninth design of the waveguide display provides a horizontal field of view of 65.0 degrees, a vertical field of view of 40.0 degrees, and a diagonal field of view of 76.3 degrees. In another configuration, the coupling element 1150A and the coupling element 1150B include a pitch in the range of 300 nm to 600 nm, and the decoupling elements 1160A and 1160B include a pitch in the range of 300 nm to 600 nm.

FIG. 11B illustrates a top view 1105 of the ninth design of the waveguide display shown in FIG. 7, in accordance with an embodiment. The top view 1105 includes the coupling element 1150A, the coupling element 1150B, the decoupling element 1160A, and the decoupling element 1160B of the output waveguide 1120.

FIG. 11C illustrates an example path 1115 of grating vectors associated with a plurality of diffraction gratings of the ninth design of the waveguide display shown in FIG. 7, in accordance with an embodiment. The example path 1115 is a path of a wave vector of the image light that is affected by the grating vectors of the coupling element 1150A, the coupling element 1150B, the first decoupling element 1160A, and the second decoupling element 1160B that the image light meets. The grating vectors are just added to change the path of the wave vector. In the example path 1115, image light from each of the source assemblies (not shown here) is associated with a respective projected radial wave vector (not shown). The image light is coupled into the output waveguide 1120 via the coupling element 1150A and the coupling element 1150B associated with a respective input grating vector (not shown). The in-coupled light is then diffracted by the first decoupling element 1160A associated with a first grating vector (not shown). The light is then diffracted (and out coupled from the output waveguide 1120) by the second decoupling element 1160B associated with a second grating vector (not shown). In one embodiment, the example path 1115 includes a summation point 1165A and a summation point 1165B. The summation of the input grating vector, the first grating vector, and the second grating vector at each of the summation point 1165A and the summation point 1160B is zero. In a second embodiment, the example path 1115 includes a summation point 1165C and a summation point 1165D. The summation of the input grating vector, the first grating vector, and the second grating vector at each of the summation point 1165C and the summation point 1165D is zero. In some configurations, the example path 1115 is a pair of equilateral triangles with the same magnitude for the input wave vector, the first grating vector, and the second grating vector.

Figure 12A:
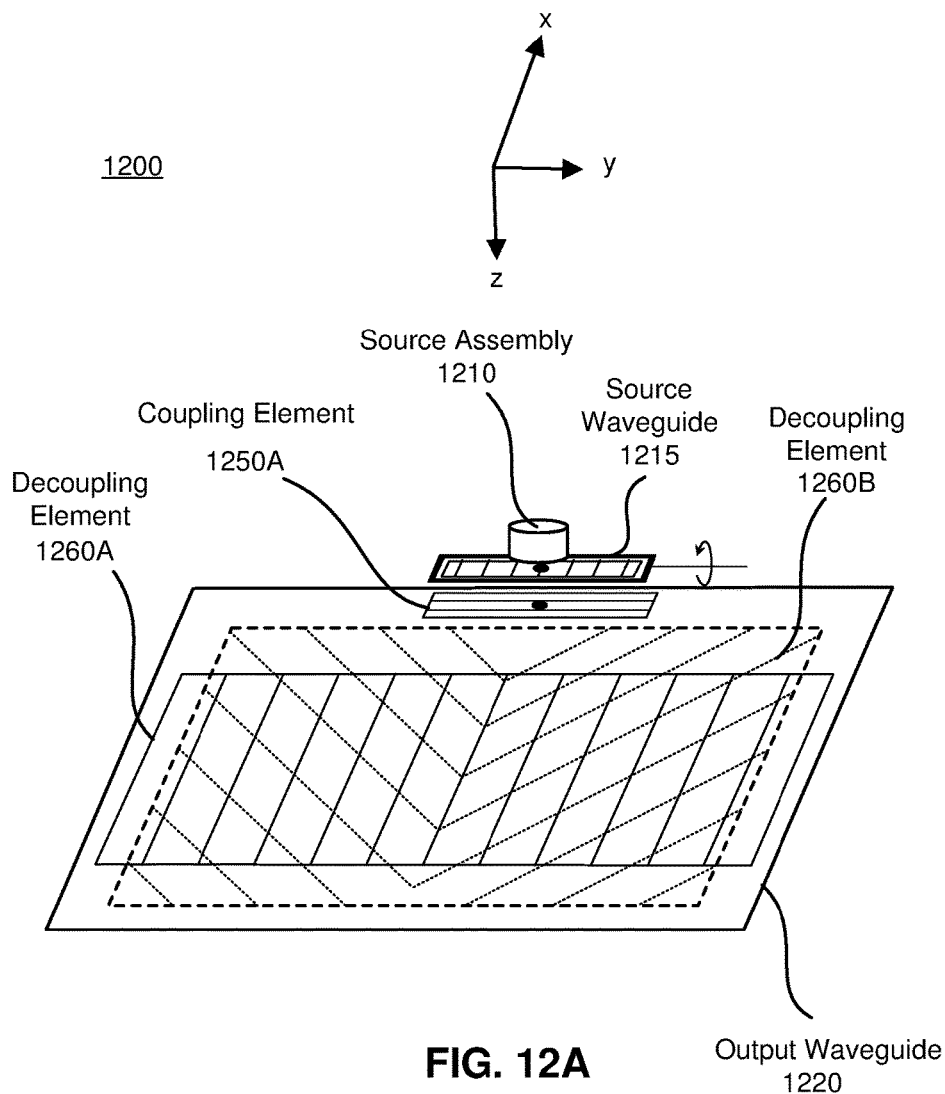
FIG. 12A illustrates an isometric view of a tenth design of the waveguide display shown in FIG. 7, in accordance with an embodiment.

FIG. 12A illustrates an isometric view 1200 of the tenth design of the waveguide display shown in FIG. 7, in accordance with an embodiment. The isometric view 1200 includes a source assembly 1210, a source waveguide 1215, and an output waveguide 1220.

The source assembly 1210 is a set of optical components that perform a generation and conditioning of an image light. In some configurations, the source assembly 1210 includes a light source and an optics system (not shown here). For example, the light source generates an image light and the optics system conditions the generated image light. The source assembly 1210 is an embodiment of the source assembly 610. The source assembly 1210 outputs an image light (not shown) to a source waveguide 1215.

The source waveguide 1215 is an optical waveguide. The source waveguide 1215 receives the image light from the source assembly 1210 and outputs an image light (not shown) to an output waveguide 1220. The image light from the source waveguide 1215 propagates along a dimension with an input wave vector as described below with reference to FIG. 12C.

The output waveguide 1220 is an optical waveguide that outputs image light to an eye 220 of a user. The output waveguide 1220 receives the image light from the source waveguide 1215 at a coupling element 1250A, and guides the received input image light to a decoupling element 1260A or a decoupling element 1260B.

The coupling element 1250A includes a width in the range of 10 mm to 20 mm, a height in the range of 2 mm to 5 mm and a pitch in the range of 0.3 to 0.6 micron. The decoupling element 1260A includes a width in the range of 10 mm to 20 mm, a height in the range of 2 mm to 5 mm and a pitch in the range of 0.3 to 0.6 micron. The decoupling element 1260B includes a width in the range of 10 mm to 20 mm, a height in the range of 2 mm to 5 mm and a pitch in the range of 0.3 to 0.6 micron. In one configuration, the tenth design of the waveguide display of FIG. 7 provides a horizontal field of view of 51.0 degrees, a vertical field of view of 31.9 degrees, and a diagonal field of view of 60.1°. In some configurations, the waveguide display of FIG. 7 includes the coupling element 1250A with a pitch in the range of 300 nm to 600 nm, and the decoupling elements 1260A and 1260B with a pitch in the range of 300 nm to 600 nm.

Figure 12B:
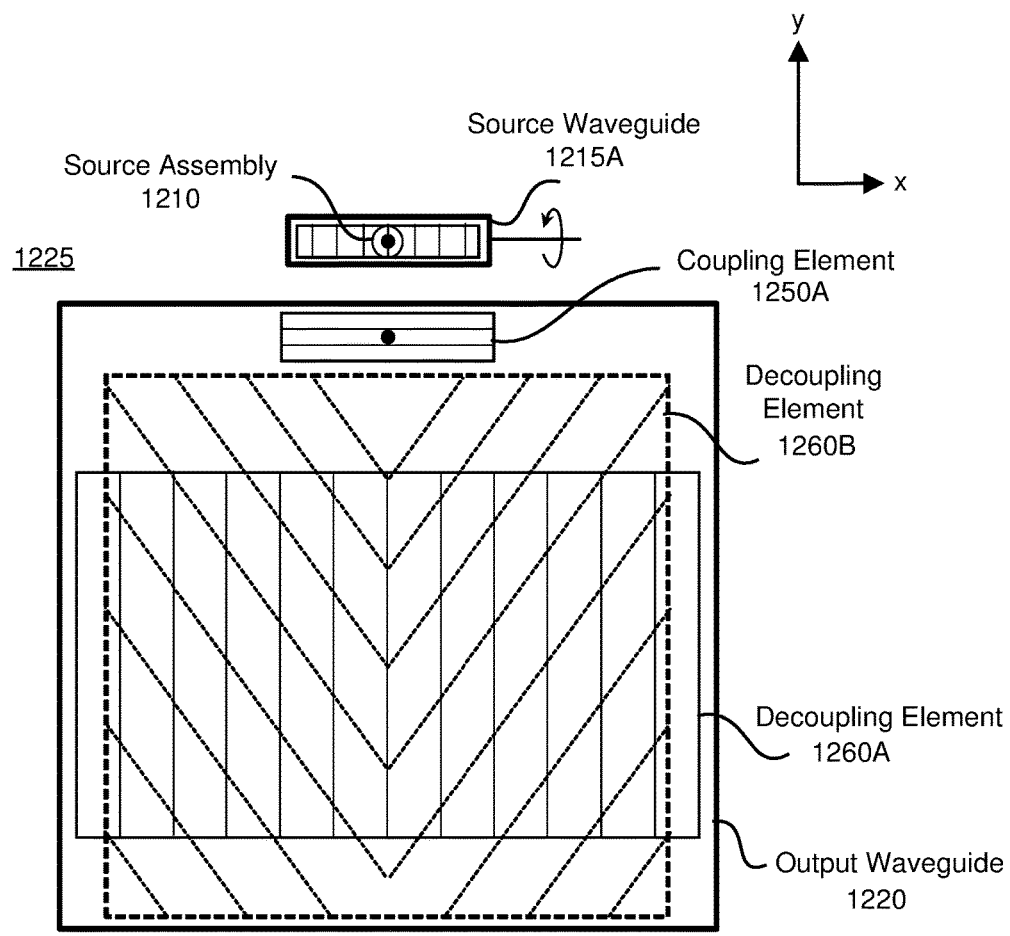
FIG. 12B illustrates a top view of the tenth design of the waveguide display shown in FIG. 7, in accordance with an embodiment.

FIG. 12B illustrates a top view 1225 of the tenth design of the waveguide display shown in FIG. 7, in accordance with an embodiment. The top view 1225 includes the source assembly 1210, the source waveguide 1215, and the output waveguide 1220.

Figure 12C:
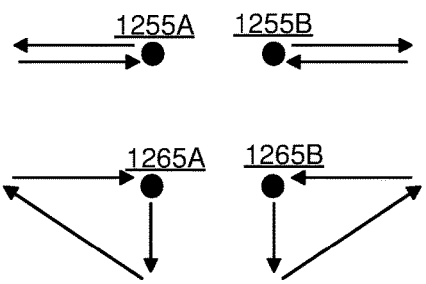
FIG. 12C illustrates an example path of grating vectors associated with a plurality of diffraction gratings of the tenth design of the waveguide display shown in FIG. 7, in accordance with an embodiment.

FIG. 12C illustrates an example path 1230 of grating vectors associated with a plurality of diffraction gratings of the tenth design of the waveguide display shown in FIG. 7, in accordance with an embodiment. The example path 1230 is a path of a wave vector of the image light that is affected by the grating vectors of the coupling element and the decoupling elements that the image light meets. The grating vectors are just added to change the path of the wave vector. In the example path 1230, image light from the source assembly 1210 is associated with a projected radial wave vector (not shown). The image light is coupled into the output waveguide 1220 via the coupling element 1250A associated with an input grating vector (not shown). The in-coupled light is then diffracted by the first decoupling element 1260A associated with a first grating vector (not shown). The light is then diffracted (and out coupled from the output waveguide) by the second decoupling element 1260B associated with a second grating vector (not shown). Note that the summation of the projected radial wave vector at the summation point 1255A is zero. Similarly, the summation of the input grating vector, the first grating vector, and the second grating vector at the summation point 1265A is zero. The summation point 1255B is an embodiment of the summation point 1255A. The summation point 1265B is an embodiment of the summation point 1265A.

The coupling element 1250A, the first decoupling element 1260A, and the second decoupling element 1260B, are diffraction gratings whose grating vectors sum to a value that is less than a threshold value, and the threshold value is close to or equal to zero. In this example, a zero summation occurs, as the vector path returns to its origination point. With the occurrence of the zero summation, the image light exits the output waveguide 1220 with the same angle as the incident angle from the source assembly 1210 since the remaining radial wave vector is associated with the FOV of the waveguide display.

Note this is a very simple example, and there are many alternative embodiments, as described below in conjunction with FIG. 12D to FIG. 12I, including various diffraction gratings whose summation of grating vectors returns to the origination point. For example, the path 1230 is shaped like an equilateral triangle with an equal magnitude of the grating vectors, and other paths may be a hexagon, a pentagon, a parallelogram, a rectangle, or any other shape whose sum of gradient vectors is less than the threshold value.

Figure 12D:
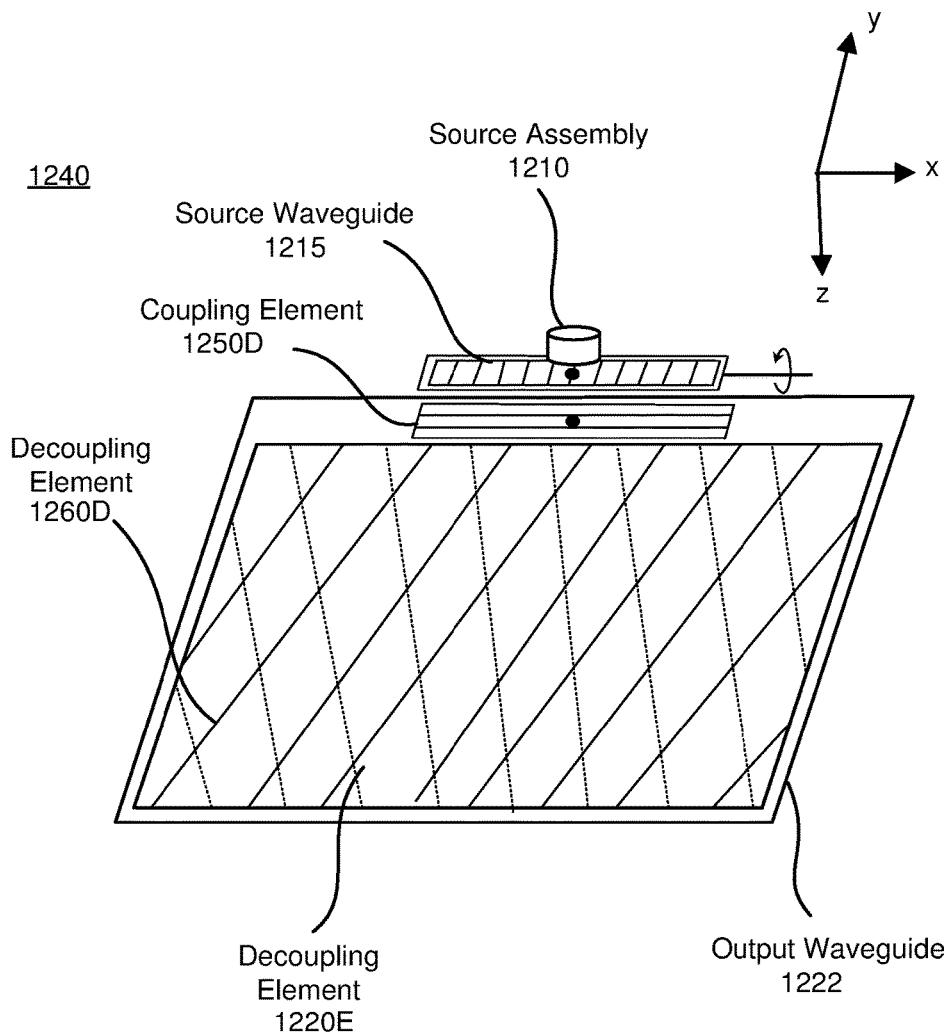
FIG. 12D illustrates an isometric view of an eleventh design of the waveguide display shown in FIG. 7, in accordance with an embodiment.

FIG. 12D illustrates an isometric view of an eleventh design of the waveguide display shown in FIG. 7, in accordance with an embodiment. The isometric view 1240 includes the source assembly 1210, a source waveguide 1215D, and an output waveguide 1222.

The source waveguide 1215D is an optical waveguide. The source waveguide 1215D receives the image light from the source assembly 1210 and outputs an image light (not shown) to an output waveguide 1222. The image light from the source waveguide 1215D propagates along a dimension with an input wave vector as described below with reference to FIG. 12F.

The output waveguide 1222 is an optical waveguide. The output waveguide 1222 includes a coupling element 1250D, a decoupling element 1260D and a decoupling element 1260E. The coupling element 1250D is an embodiment of the coupling element 350. The decoupling element 1260D is an embodiment of the decoupling element 360A. The decoupling element 1260E is an embodiment of the decoupling element 360B. In one configuration, the eleventh design of the waveguide display of FIG. 12D provides a horizontal field of view of 53.0 degrees, a vertical field of view of 28.2 degrees, and a diagonal field of view of 60.0°. In another configuration, the coupling element 1250D includes a pitch in the range of 300 nm to 600 nm, and the decoupling element 1260D and the decoupling element 1260E include a pitch in the range of 300 nm to 600 nm.

Figure 12E:
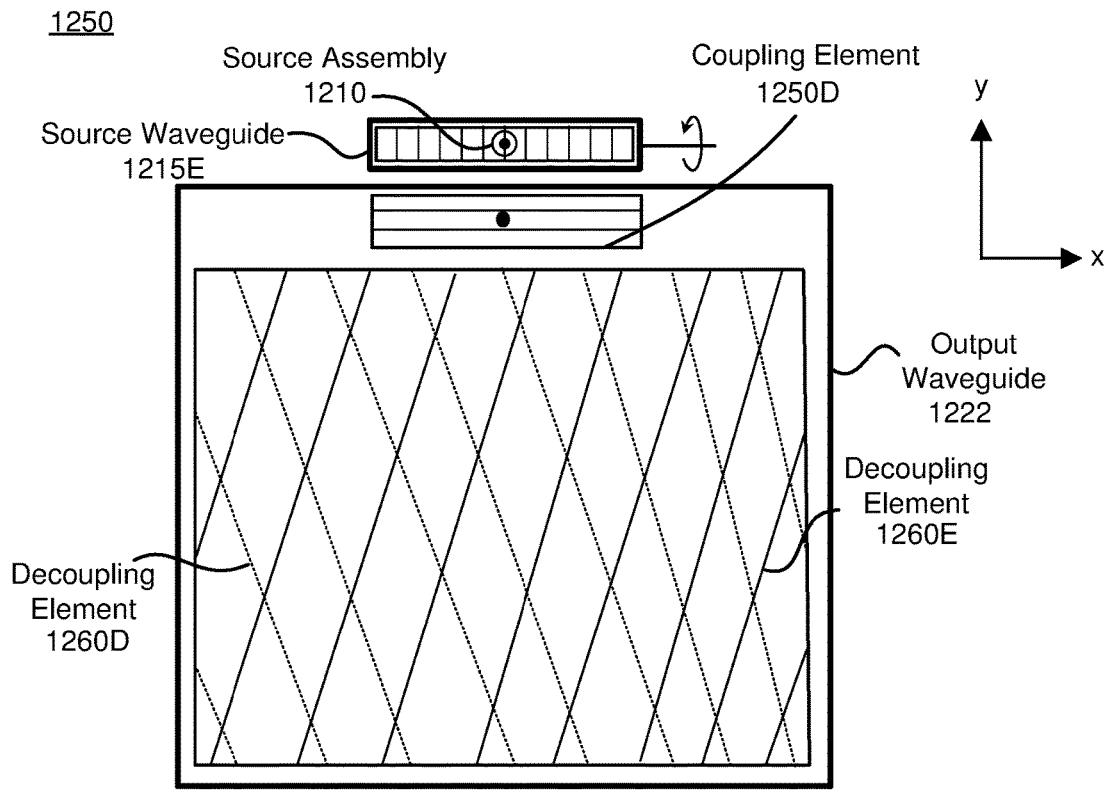
FIG. 12E illustrates a top view of the eleventh design of the waveguide display shown in FIG. 7, in accordance with an embodiment.

FIG. 12E illustrates a top view 1250 of the eleventh design of the waveguide display shown in FIG. 7, in accordance with an embodiment. The top view 1250 includes the source assembly 1210, the source waveguide 1215E, and the output waveguide 1222.

Figure 12F:
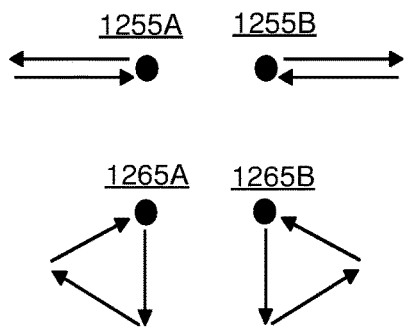
FIG. 12F illustrates an example path of grating vectors associated with a plurality of diffraction gratings of the eleventh design of the waveguide display shown in FIG. 7, in accordance with an embodiment.

FIG. 12F illustrates an example path 1270 of grating vectors associated with a plurality of diffraction gratings of the eleventh design of the waveguide display shown in FIG. 7, in accordance with an embodiment. The example path 1270 is a path of a wave vector of the image light that is affected by the grating vectors of the coupling element 1250D, the decoupling element 1260D, and the decoupling element 1260E that the image light meets. The grating vectors are just added to change the path of the wave vector. The example path 1270 is an embodiment of the example path 430.

Figure 12G:
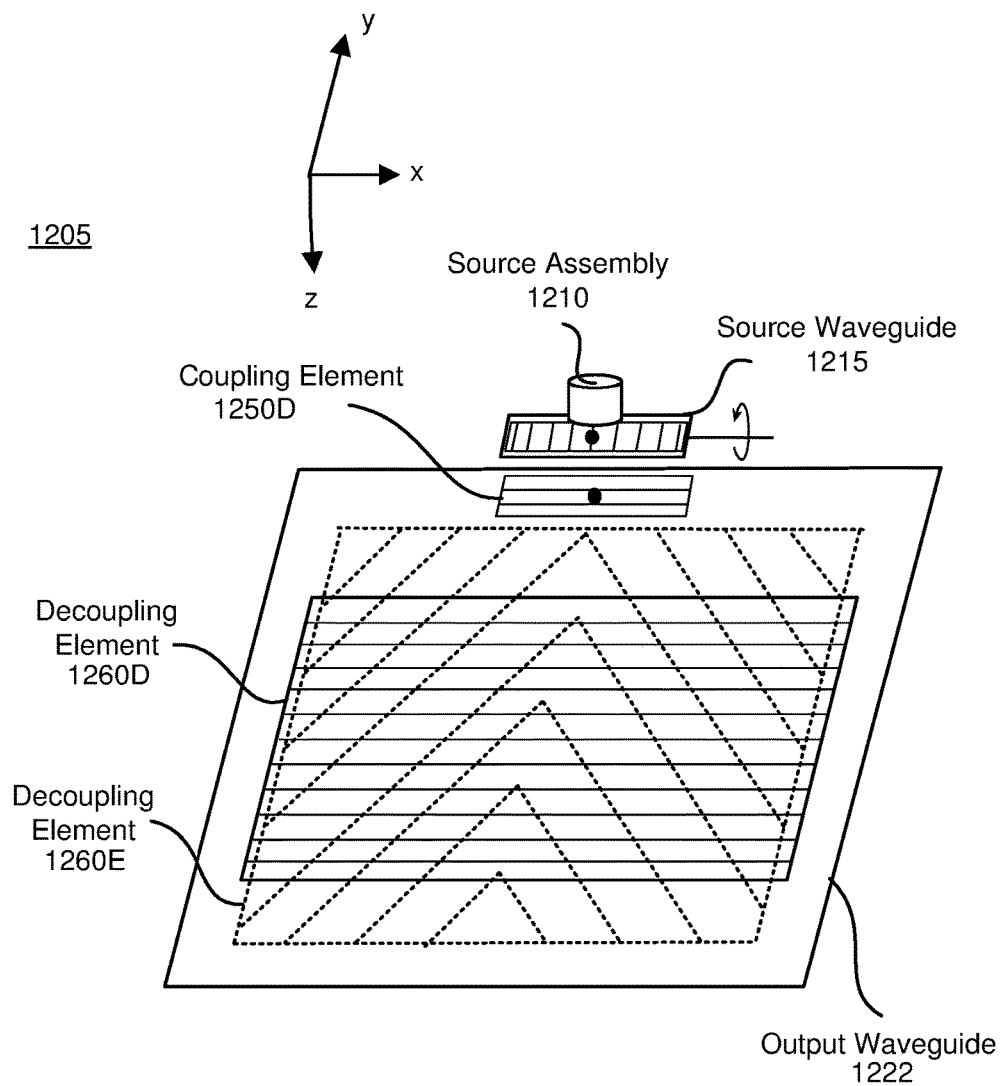
FIG. 12G illustrates an isometric view of a twelfth design of the waveguide display shown in FIG. 7, in accordance with an embodiment.

FIG. 12G illustrates an isometric view 1205 of a twelfth design of the waveguide display shown in FIG. 7, in accordance with an embodiment. The isometric view 1205 includes the source assembly 1210, a source waveguide 1215D, and an output waveguide 1222.

The source waveguide 1215D is an optical waveguide. The source waveguide 1215D receives the image light from the source assembly 1210 and outputs an image light (not shown) to an output waveguide 1222. The image light from the source waveguide 1215D propagates along a dimension with an input wave vector as described below with reference to FIG. 12I.

The output waveguide 1222 is an optical waveguide. The output waveguide 1222 includes a coupling element 1250D, a decoupling element 1260D and a decoupling element 1260E. The coupling element 1250D includes a width in the range of 10 mm to 20 mm, a height in the range of 2 mm to 5 mm and a pitch in the range of 0.3 to 0.6 micron. The decoupling element 1260D includes a width in the range of 10 mm to 20 mm, a height in the range of 2 mm to 5 mm and a pitch in the range of 0.3 to 0.6 micron. The decoupling element 1260E includes a width in the range of 10 mm to 20 mm, a height in the range of 2 mm to 5 mm and a pitch in the range of 0.3 to 0.6 micron.

Figure 12H:
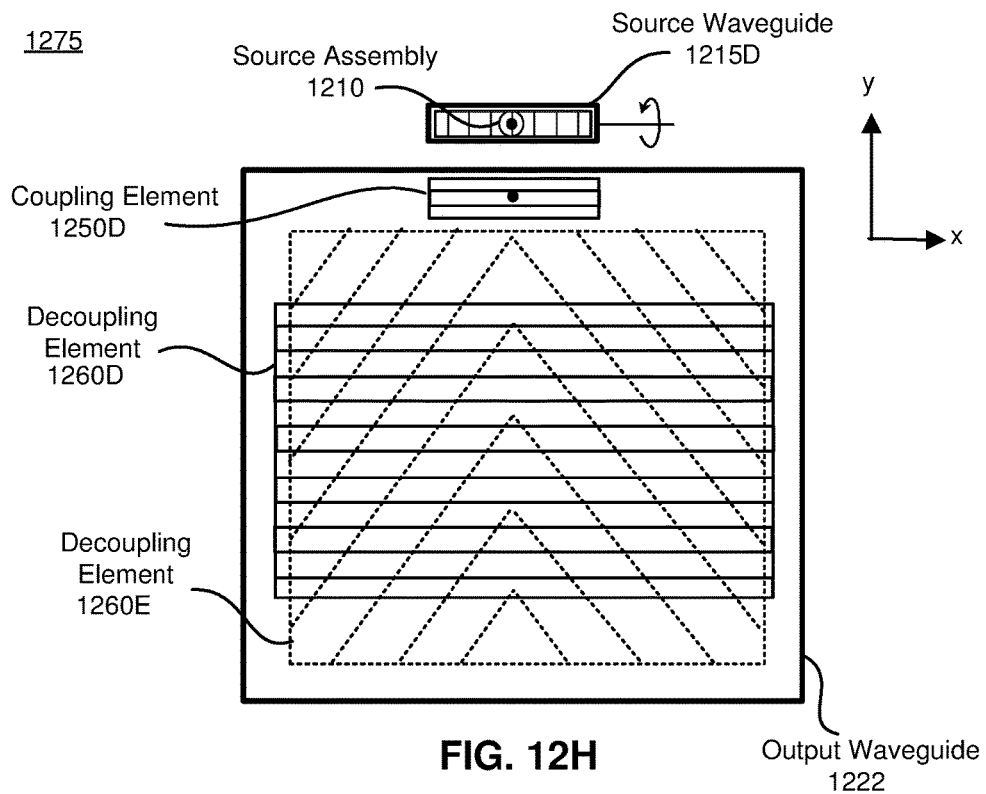
FIG. 12H illustrates a top view of the twelfth design of the waveguide display shown in FIG. 7, in accordance with an embodiment.

FIG. 12H illustrates a top view 1275 of the twelfth design of the waveguide display shown in FIG. 7, in accordance with an embodiment. The top view 1275 includes the source assembly 1210, the source waveguide 1215D, and the output waveguide 1222

Figure 12I:
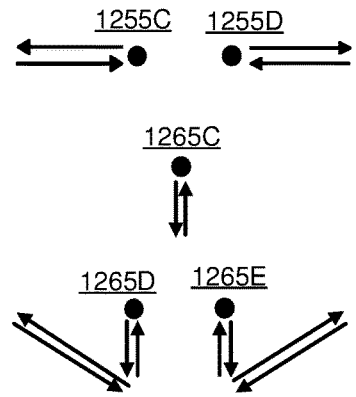
FIG. 12I illustrates an example path of grating vectors associated with a plurality of diffraction gratings of the twelfth design of the waveguide display shown in FIG. 7, in accordance with an embodiment.

FIG. 12I illustrates an example path of grating vectors associated with a plurality of diffraction gratings of the twelfth design of the waveguide display shown in FIG. 7, in accordance with an embodiment. The example path 1285 is a path of a wave vector of the image light that is affected by the grating vectors of the coupling element 1250D, the first decoupling element 1260D, and the second decoupling element 1260E that the image light meets. The grating vectors are just added to change the path of the wave vector. In the example path 1285, image light from the source assembly 1210 is associated with a projected radial wave vector (not shown). The image light is coupled into the output waveguide 1222 via the coupling element 1250D associated with an input grating vector (not shown). The in-coupled light is then diffracted by the first decoupling element 1260D associated with a first grating vector (not shown). The light is then diffracted (and out coupled from the output waveguide) by the second decoupling element 1260E associated with a second grating vector (not shown). In one embodiment, the example path 1285 includes a first summation point 1255C, and a second summation point 1265C. Note that the summation of the projected radial wave vector at the first summation point 1255C is zero. The summation of the input grating vector, the first grating vector, and the second grating vector at the second summation point 1265C is zero. In a second embodiment, the example path 1285 includes the first summation point 12555C, a third summation point 1265D, and a fourth summation point 1265E. The summation of the input grating vector, the first grating vector, and the second grating vector at the third summation point 1265D is zero. Similarly, the summation of the input grating vector, the first grating vector, and the second grating vector at the fourth summation point 1265E is also zero.

In an alternate configuration, the example path 1285 includes a fifth summation point 1255D, and the first summation point 1265C. The fifth summation point 1255D is an embodiment of the first summation point 1255C. In yet another configuration, the example path 1285 includes the fifth summation point 1255D, the third summation point 1265D, and the fourth summation point 1265E.

Figure 13:
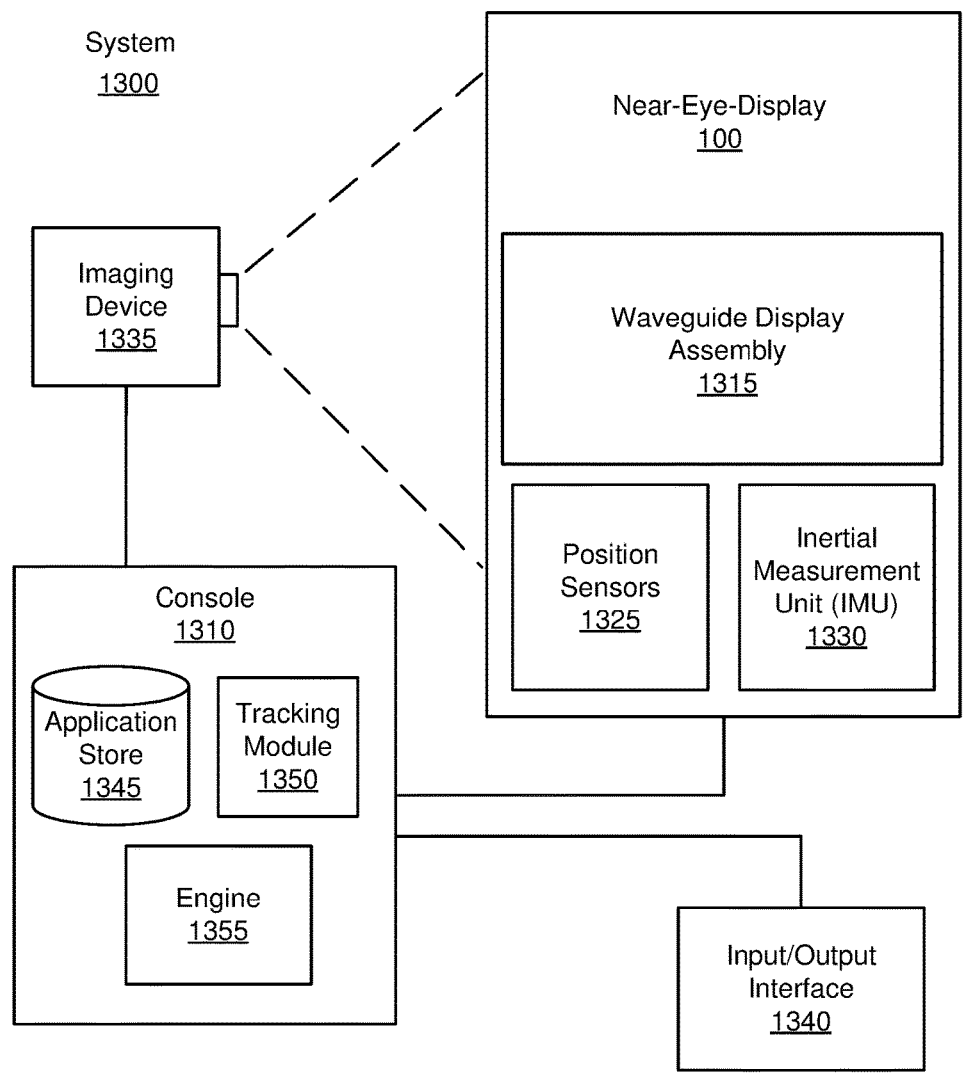
FIG. 13 is a block diagram of a system including the NED of FIG. 1, in accordance with an embodiment.

FIG. 13 is a block diagram of a system 1300 including the NED 100 of FIG. 1, according to an embodiment. The system 1300 shown by FIG. 13 comprises the NED 100, an imaging device 1335, and an input/output interface 1340 that are each coupled to the console 1310. While FIG. 13 shows an example system 1300 including one NED 100, one imaging device 1335, and one input/output interface 1340, in other embodiments, any number of these components may be included in the system 1300. For example, there may be multiple NEDs 100 each having an associated input/output interface 1340 and being monitored by one or more imaging devices 1335, with each NED 100, input/output interface 1340, and imaging devices 1335 communicating with the console 1310. In alternative configurations, different and/or additional components may be included in the system 1300. Similarly, functionality of one or more of the components can be distributed among the components in a different manner than is described here. For example, some or all of the functionality of the console 1310 may be contained within the NED 100. Additionally, in some embodiments the system 1300 may be modified to include other system environments, such as an AR system environment and/or a mixed reality (MR) environment.

The NED 100 is a near-eye display that presents media to a user. Examples of media presented by the NED 100 include one or more images, video, audio, or some combination thereof. In some embodiments, audio is presented via an external device (e.g., speakers and/or headphones) that receives audio information from the NED 100, the console 1310, or both, and presents audio data based on the audio information. In some embodiments, the NED 100 may also act as an AR eye-wear glass. In these embodiments, the NED 100 augments views of a physical, real-world environment with computer-generated elements (e.g., images, video, sound, etc.).

The NED 100 includes a waveguide display assembly 1315, one or more position sensors 1325, and the inertial measurement unit (IMU) 1330. The waveguide display assembly 1315 includes the source assembly 310, the output waveguide 320, and the controller 330 of FIG. 3 The output waveguide 320 includes multiple diffraction gratings such that light entering the output waveguide 320 exits the waveguide display assembly 1315 at the same angle. Details for various embodiments of the waveguide display element are discussed in detail with reference to FIGS. 3 and 4. In another embodiment, the waveguide display assembly 1315 includes the source assembly 610, the output waveguide 620, and the controller 330, as described above with reference to FIGS. 6 and 7. In an alternate embodiment, the waveguide display assembly 1315 includes the first source assembly 1110A, the second source assembly 910B, the output waveguide 920, and the controller 330, as described above with reference to FIGS. 9 and 10. The waveguide display assembly includes, e.g., a waveguide display, a stacked waveguide display, a varifocal waveguide display, or some combination thereof.

The IMU 1330 is an electronic device that generates fast calibration data indicating an estimated position of the NED 100 relative to an initial position of the NED 100 based on measurement signals received from one or more of the position sensors 1325. A position sensor 1325 generates one or more measurement signals in response to motion of the NED 100. Examples of position sensors 1325 include: one or more accelerometers, one or more gyroscopes, one or more magnetometers, a suitable type of sensor that detects motion, a type of sensor used for error correction of the IMU 1330, or some combination thereof. The position sensors 1325 may be located external to the IMU 1330, internal to the IMU 1330, or some combination thereof. In the embodiment shown by FIG. 13, the position sensors 1325 are located within the IMU 1330, and neither the IMU 1330 nor the position sensors 1325 are visible to the user (e.g., located beneath an outer surface of the NED 100).

Based on the one or more measurement signals generated by the one or more position sensors 1325, the IMU 1330 generates fast calibration data indicating an estimated position of the NED 100 relative to an initial position of the NED 100. For example, the position sensors 1325 include multiple accelerometers to measure translational motion (forward/back, up/down, left/right) and multiple gyroscopes to measure rotational motion (e.g., pitch, yaw, roll). In some embodiments, the IMU 1325 rapidly samples the measurement signals from various position sensors 1325 and calculates the estimated position of the NED 100 from the sampled data. For example, the IMU 1330 integrates the measurement signals received from one or more accelerometers over time to estimate a velocity vector and integrates the velocity vector over time to determine an estimated position of a reference point on the NED 100. The reference point is a point that may be used to describe the position of the NED 100. While the reference point may generally be defined as a point in space; however, in practice, the reference point is defined as a point within the NED 100.

The imaging device 1335 generates slow calibration data in accordance with calibration parameters received from the console 1310. The imaging device 1335 may include one or more cameras, one or more video cameras, any other device capable of capturing images, or some combination thereof. Additionally, the imaging device 1335 may include one or more filters (e.g., used to increase signal to noise ratio). Slow calibration data is communicated from the imaging device 1335 to the console 1310, and the imaging device 1335 receives one or more calibration parameters from the console 1310 to adjust one or more imaging parameters (e.g., focal length, focus, frame rate, ISO, sensor temperature, shutter speed, aperture, etc.).

The input/output interface 1340 is a device that allows a user to send action requests to the console 1310. An action request is a request to perform a particular action. For example, an action request may be to start or end an application or to perform a particular action within the application. The input/output interface 1340 may include one or more input devices. Example input devices include: a keyboard, a mouse, a game controller, or any other suitable device for receiving action requests and communicating the received action requests to the console 1310. An action request received by the input/output interface 1340 is communicated to the console 1310, which performs an action corresponding to the action request. In some embodiments, the input/output interface 1340 may provide haptic feedback to the user in accordance with instructions received from the console 1310. For example, haptic feedback is provided when an action request is received, or the console 1310 communicates instructions to the input/output interface 1340 causing the input/output interface 1340 to generate haptic feedback when the console 1310 performs an action.

The console 1310 provides media to the NED 100 for presentation to the user in accordance with information received from one or more of: the imaging device 1335, the NED 100, and the input/output interface 1340. In the example shown in FIG. 13, the console 1310 includes an application store 1345, a tracking module 1350, and an engine 1355. Some embodiments of the console 1310 have different modules than those described in conjunction with FIG. 13. Similarly, the functions further described below may be distributed among components of the console 1310 in a different manner than is described here.

The application store 1345 stores one or more applications for execution by the console 1310. An application is a group of instructions, that when executed by a processor, generates content for presentation to the user. Content generated by an application may be in response to inputs received from the user via movement of the NED 100 or the input/output interface device 1340. Examples of applications include: gaming applications, conferencing applications, video playback application, or other suitable applications.

The tracking module 1350 calibrates the system 1300 using one or more calibration parameters and may adjust one or more calibration parameters to reduce error in determination of the position of the NED 100. For example, the tracking module 1350 adjusts the focus of the imaging device 1335 to obtain a more accurate position for observed locators on the system 1300. Moreover, calibration performed by the tracking module 1350 also accounts for information received from the IMU 1330.

The tracking module 1350 tracks movements of the NED 100 using slow calibration information from the imaging device 1335. The tracking module 1350 also determines positions of a reference point of the NED 100 using position information from the fast calibration information. Additionally, in some embodiments, the tracking module 1350 may use portions of the fast calibration information, the slow calibration information, or some combination thereof, to predict a future location of the NED 100. The tracking module 1350 provides the estimated or predicted future position of the NED 100 to the VR engine 1355.

The engine 1355 executes applications within the system 1300 and receives position information, acceleration information, velocity information, predicted future positions, or some combination thereof of the NED 100 from the tracking module 1350. In some embodiments, the information received by the engine 1355 may be used for producing a signal (e.g., display instructions) to the waveguide display assembly 1315 that determines the type of content presented to the user. For example, if the received information indicates that the user has looked to the left, the engine 1355 generates content for the NED 100 that mirrors the user's movement in a virtual environment by determining the type of source and the waveguide that must operate in the waveguide display assembly 1315. For example, the engine 1355 may produce a display instruction that would cause the waveguide display assembly 1315 to generate content with red, green, and blue color. Additionally, the engine 1355 performs an action within an application executing on the console 1310 in response to an action request received from the input/output interface 1340 and provides feedback to the user that the action was performed. The provided feedback may be visual or audible feedback via the NED 100 or haptic feedback via the input/output interface 1340.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein. Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An output waveguide comprising:
   a single waveguide body that includes a first surface and a second surface that is opposite to the first surface, the first surface and the second surface are parallel to the first dimension and the second dimension;
   at least a first coupling element configured to receive an image light emitted from a light source assembly configured to emit image light and couple the received image light into the waveguide body, and the waveguide body expands the received image light in at least one dimension to transmit a first expanded image light;
   a second decoupling element included as part of the waveguide body, and
   a third decoupling element included as part of the waveguide body, and positioned opposite to the second decoupling element, each of the second decoupling element and the third decoupling element configured to expand the first expanded image light along a different dimension to form second expanded image light and output the second expanded image light to an eyebox at a distance from the waveguide body along a third dimension, the outputted image light encompassing the first angular range and the second angular range throughout the eyebox along the first dimension and the second dimension; and
   a controller configured to generate display instructions and provide the display instructions to each of the one or more projectors of the light source assembly.

2. The output waveguide of claim 1, wherein the first coupling element and the second decoupling element are separated by a distance at least along the first dimension and the second dimension, and the first coupling element and the second decoupling element located at a central position along the second dimension.

3. The output waveguide of claim 1, wherein the first coupling element is a diffraction grating on at least the first surface and the second surface of the waveguide body, the first coupling element configured to couple the first angular range and the second angular range of the image light emitted by the light source assembly into the waveguide body.

4. The output waveguide of claim 1, wherein
   the second decoupling element is a diffraction grating configured to receive the image light from the first coupling element covering a first portion of the first angular range emitted by the light source assembly, the second decoupling element diffracts the image light to a first diffracted order to expand the image light to the second dimension; and
   the third decoupling element is a diffraction grating configured to receive the image light from the first coupling element covering a second portion of the first angular range emitted by the light source assembly, and the third decoupling element diffracts the image light to a first diffracted order to expand the image light to the second dimension.

5. The output waveguide of claim 1, wherein the second decoupling element and the third decoupling element are located on the first surface of the waveguide body with an interfacial layer between the second decoupling element and the third decoupling element.

6. The output waveguide of claim 1, wherein the second decoupling element and the third decoupling element are located on the second surface of the waveguide body with an interfacial layer between the second decoupling element and the third decoupling element.

7. The output waveguide of claim 1, wherein the second decoupling element and the third decoupling element are embedded into the waveguide body and separated by an interfacial layer.

8. The output waveguide of claim 1, wherein the first coupling element includes a first grating element and a second grating element separated along the first dimension.

9. The output waveguide of claim 8, wherein the third decoupling element is located between the first grating element and the second grating element, and the third decoupling element is located at a central location on the second dimension between the first grating element and the second grating element.

10. The output waveguide of claim 1, wherein the first coupling element includes a first grating element and a second grating element separated along the second dimension.

11. The output waveguide of claim 10, wherein the third decoupling element is located between the first grating element and the second grating element, and the third decoupling element is located at a central location on the first dimension between the first grating element and the second grating element.

12. The output waveguide of claim 1, wherein each of the first coupling element, the second decoupling element and the third decoupling element is selected from a group consisting of: a diffraction grating, a holographic grating, one or more prismatic surface elements, an array of holographic reflectors, and some combination thereof.

13. The output waveguide of claim 1, wherein the first coupling element is a refractive surface configured to couple the image light from the light source assembly into the waveguide body.

14. The output waveguide of claim 1, wherein
   the second decoupling element includes one or more cascaded reflectors configured to deflect the image light over the first angular range, and the third decoupling element includes one or more cascaded reflectors configured to output the expanded image light to the eyebox.

\* \* \* \* \*

UNITED STATES PATENT AND TRADEMARK OFFICE
CERTIFICATE OF CORRECTION

PATENT NO. : 10,185,151 B2
APPLICATION NO. : 15/704190
DATED : January 22, 2019
INVENTOR(S) : Hee Yoon Lee, Wanli Chi and Pasi Saarikko Page 1 of 1

It is certified that error appears in the above-identified patent and that said Letters Patent is hereby corrected as shown below:

In the Claims

Column 33, Claim 1, Line 19, delete "form second expanded image light" and insert -- form a second expanded image light --

Signed and Sealed this
Twenty-first Day of May, 2019

Andrei Iancu
*Director of the United States Patent and Trademark Office*

UNITED STATES PATENT AND TRADEMARK OFFICE
CERTIFICATE OF CORRECTION

PATENT NO. : 10,185,151 B2
APPLICATION NO. : 15/704190
DATED : January 22, 2019
INVENTOR(S) : Hee Yoon Lee, Wanli Chi and Pasi Saarikko It is certified that error appears in the above-identified patent and that said Letters Patent is hereby corrected as shown below:

In the Claims

Column 33, Line 48, Claim 1, delete "a second decoupling" and insert -- a first decoupling --.
Column 33, Line 50, Claim 1, delete "a third decoupling" and insert -- a second decoupling --.
Column 33, Line 51-53, Claim 1, delete "the second decoupling element, each of the second decoupling element and the third decoupling element" and insert -- the first decoupling element, each of the first decoupling element and the second decoupling element --.
Column 33, Line 66, Claim 2, delete "the second decoupling element" and insert -- the first decoupling element --.
Column 34, Line 2, Claim 2, delete "second decoupling element" and insert -- first decoupling element --.
Column 34, Line 12, Claim 4, delete "the second decoupling element" and insert -- the first decoupling element --.
Column 34, Line 16, Claim 4, delete "second decoupling element" and insert -- first decoupling element --.
Column 34, Line 19, Claim 4, delete "the third decoupling element" and insert -- the second decoupling element --.
Column 34, Line 24, Claim 4, delete "the third decoupling element" and insert -- the second decoupling element --.
Column 34, Lines 27-28, Claim 5, delete "the second decoupling element and the third decoupling element" and insert -- the first decoupling element and the second decoupling element --.
Column 34, Lines 30-31, Claim 5, delete "the second decoupling element and the third decoupling element" and insert -- the first decoupling element and the second decoupling element --.
Column 34, Lines 32-33, Claim 6, delete "the second decoupling element and the third decoupling element" and insert -- the first decoupling element and the second decoupling element --.
Column 34, Lines 35-36, Claim 6, delete "the second decoupling element and the third decoupling element" and insert -- the first decoupling element and the second decoupling element --.
Column 34, Lines 37-38, Claim 7, delete "the second decoupling element and the third decoupling element" and insert -- the first decoupling element and the second decoupling element --.

Signed and Sealed this
Third Day of December, 2019

Andrei Iancu
*Director of the United States Patent and Trademark Office*

CERTIFICATE OF CORRECTION (continued)
U.S. Pat. No. 10,185,151 B2

Column 34, Lines 45-46, Claim 9, delete "the third decoupling element" and insert -- the second decoupling element --.
Column 34, Lines 47-48, Claim 9, delete "the third decoupling element" and insert -- the second decoupling element --.
Column 34, Lines 55-56, Claim 11, delete "the third decoupling element" and insert -- the second decoupling element --.
Column 34, Lines 57-58, Claim 11, delete "the third decoupling element" and insert -- the second decoupling element --.
Column 34, Lines 61-62, Claim 12, delete "the second decoupling element and the third decoupling element" and insert -- the first decoupling element and the second decoupling element --.
Column 35, Line 6, Claim 14, delete "the second decoupling element" and insert -- the first decoupling element --.
Column 35, Lines 8-9, Claim 14, delete "the third decoupling element" and insert -- the second decoupling element --.